US011366236B2

(12) United States Patent
Kassas et al.

(10) Patent No.: US 11,366,236 B2
(45) Date of Patent: Jun. 21, 2022

(54) SIGNALS OF OPPORTUNITY AIDED INERTIAL NAVIGATION

(71) Applicant: The Regents of the University of California, Oakland, CA (US)

(72) Inventors: Zak M. Kassas, Irvine, CA (US); Joshua J. Morales, Colton, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 384 days.

(21) Appl. No.: 16/335,982

(22) PCT Filed: Sep. 22, 2017

(86) PCT No.: PCT/US2017/053018
§ 371 (c)(1),
(2) Date: Mar. 22, 2019

(87) PCT Pub. No.: WO2018/106311
PCT Pub. Date: Jun. 14, 2018

(65) Prior Publication Data
US 2020/0025942 A1 Jan. 23, 2020

Related U.S. Application Data

(60) Provisional application No. 62/561,026, filed on Sep. 20, 2017, provisional application No. 62/398,413, filed on Sep. 22, 2016.

(51) Int. Cl.
*G01S 19/46* (2010.01)
*G01S 19/39* (2010.01)
(Continued)

(52) U.S. Cl.
CPC ............ *G01S 19/46* (2013.01); *G01C 21/165* (2013.01); *G01S 19/393* (2019.08); *G01S 19/47* (2013.01)

(58) Field of Classification Search
CPC ........ G01S 19/46; G01S 19/393; G01S 19/47; G01C 21/165
See application file for complete search history.

(56) References Cited

U.S. PATENT DOCUMENTS

2005/0197769 A1* 9/2005 Soehren ............... G01C 21/165
701/472
2007/0282565 A1 12/2007 Bye et al.
(Continued)

FOREIGN PATENT DOCUMENTS

CN 109983361 A 7/2019

OTHER PUBLICATIONS

International Application Serial No. PCT/US2017/053018, International Search Report dated Jun. 8, 2018, 2 pgs.
(Continued)

*Primary Examiner* — Manuel L Barbee
(74) *Attorney, Agent, or Firm* — Schwegman Lundberg & Woessner, P.A

(57) ABSTRACT

A signal of opportunity (SOP)-aided inertial navigation system (INS) framework provides various technical solutions to technical problems facing GNSS implementations. A mobile receiver, whether handheld or vehicle-mounted, has access to Global Navigation Satellite System (GNSS) signals, multiple unknown terrestrial SOPs, and IMU measurements, which are used to estimate receiver states. When GNSS signals become unreliable, the mobile receiver continues to navigate using the SOP-aided INS. The SOP-aided INS produces bounded estimation errors in the absence of GNSS signals, and the bounds are dependent on the quantity and quality of exploited SOPs.

20 Claims, 15 Drawing Sheets

(51) Int. Cl.
G01S 19/47 (2010.01)
G01C 21/16 (2006.01)

(56) References Cited

U.S. PATENT DOCUMENTS

2008/0036652 A1* 2/2008 Shore .................. E21B 47/0232
                                                    342/357.31
2009/0121940 A1   5/2009 Ladd et al.
2009/0322601 A1  12/2009 Ladd et al.
2013/0265193 A1  10/2013 Kennedy et al.
2015/0319725 A1  11/2015 Marshall
2015/0350914 A1* 12/2015 Baxley ..................... H04L 63/02
                                                    726/11

OTHER PUBLICATIONS

International Application Serial No. PCT/US2017/053018, Written Opinion dated Jun. 8, 2018, 9 pgs.
International Application Serial No. PCT/US2017/053018, International Preliminary Report on Patentability dated Apr. 4, 2019, 11 pgs.

* cited by examiner

SIGNALS OF OPPORTUNITY AIDED INERTIAL NAVIGATION

RELATED APPLICATION AND PRIORITY CLAIM

This application is a U.S. National Stage Filing under 35 U.S.C. 371 from International Application No. PCT/US2017/053018, filed on Sep. 22, 2017, and published as WO 2018/106311 A2 on Jun. 14, 2018, which is related and claims priority to U.S. Provisional Application No. 62/398,413, filed on Sep. 22, 2016 and entitled "SIGNALS OF OPPORTUNITY AIDED INERTIAL NAVIGATION," and is related and claims priority to U.S. Provisional Application No. 62/561,026, filed on Sep. 20, 2017 and entitled "DISTRIBUTED SIGNALS OF OPPORTUNITY AIDED INERTIAL NAVIGATION," the entirety of each of which is incorporated herein by reference.

STATEMENT OF GOVERNMENT SPONSORED SUPPORT

The subject matter herein was developed with Government support under Grant (or Contract) No. Grant N00014-16-1-2305, awarded by the by the Office of Naval Research. The Government has certain rights to the subject matter herein.

BACKGROUND

Some existing navigation systems integrate global navigation satellite system (GNSS) with an inertial navigation system (INS). When these systems are integrated, the long-term stability of a GNSS navigation solution complements the short-term accuracy of an INS. However, if GNSS signals become unavailable, the errors of an INS diverge. What is needed is an improved integrated GNSS-INS navigation system.

DESCRIPTION OF EMBODIMENTS

Figure 1:
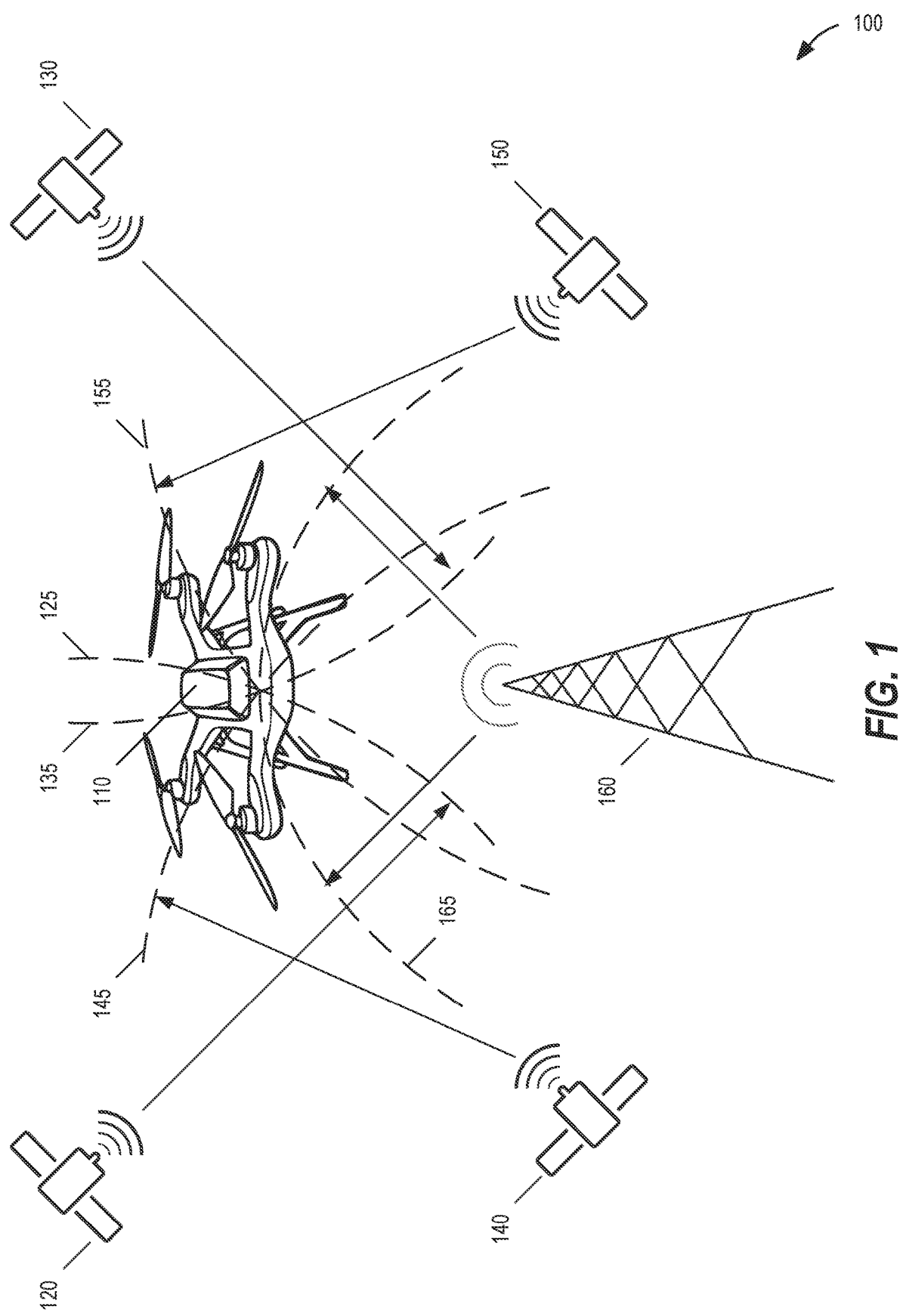
FIG. 1 is a diagram of a signal of opportunity (SOPs) GNSS system, in accordance with at least one embodiment.

FIG. 1 is a diagram of a signal of opportunity (SOP) GNSS system 100, in accordance with at least one embodiment. SOP GNSS system 100 provides various solutions to technical problems facing GNSS implementations. System 10W includes a vehicle 110, such as an unmanned aerial vehicle or other mobile vehicle. Vehicle 110 includes a GNSS/INS navigation system, which provides a navigation solution (e.g., location) of the vehicle 110 using GNSS data combined with INS data. System 100 includes at least four GNSS satellites 120, 130, 140, and 150, though additional GNSS satellites may be used. Similarly, system 100 includes at least one SOP transceiver 160, though additional SOP transceivers may be used SOPs may enhance or enable otherwise unavailable navigation, such as whenever signals from GNSS satellites 120, 130, 140, and 150 become inaccessible or untrustworthy.

Terrestrial SOPs are abundant and are available at varying geometric configurations, and may be used to improve GNSS/INS navigation. The vehicle 110 receives GNSS signals from the four GNSS satellites 120, 130, 140, and 150 and calculates pseudoranges, where the pseudoranges provide an estimated radius for the arc lengths 125, 135, 145, and 155. Similarly, vehicle 110 calculates an additional pseudorange arc 165 based on the SOP transceiver 160. The INS portion of the GNSS/INS navigation system provides inertial navigation data, such as acceleration and rotation. The GNSS data and the INS data are combined to determine an estimated position of the vehicle 110.

The SOP transceiver 160 may be used to improve navigation reliability whenever GNSS signals become inaccessible or unreliable. The navigation system described herein is significantly different from existing technologies, such as a ground based augmentation system (GBAS), which requires the deployment of proprietary infrastructure, such as pseudolite beacons. In contrast to deploying pseudolite beacons, this technology uses existing radio infrastructure. For example, the SOP transceiver 160 may be either an AM/FM radio tower, a cellular tower, a digital television tower, a Wi-Fi transceiver, or any other emitter equipped with a radio transceiver. A navigation systems could rely on SOPs to aid an INS in the absence of GNSS signals, enabling a navigation solution with bounded errors. The navigation system may include an architecture to fuse GNSS and inertial measurement unit (IMU) measurements, with loosely-coupled, tightly-coupled, and deeply-coupled estimators. Regardless of the coupling type, the errors of a GNSS-aided INS will diverge in the absence of GNSS signals, and the rate of divergence depends on the quality of the IMU. Consumer and small-size applications that use affordable micro-electro-mechanical systems (MEMS) grade IMUs are particularly susceptible to large error divergence rates. While high quality IMUs may reduce the rate of error divergence, they may violate cost, size, weight, or power constraints.

As described herein, a tightly-coupled framework that fuses IMU data with SOP pseudoranges provides improved navigation performance. In particular, the performance of the SOP-aided INS in a real-world environment is based on (1) the number of exploited SOPs and (2) the quality of the SOPs (e.g., the stability of their oscillators), and shows improved performance over traditional tightly-coupled GNSS-INS integration strategies. SOPs are transmitted at a wide range of frequencies and directions, making them an attractive supplement to GNSS signals to improve the accuracy of a navigation solution. SOPs are abundant in GNSSchallenged environments, making them particularly attractive aiding sources for an INS when GNSS signals become unreliable. However, unlike GNSS satellite vehicle states, the states of SOPs, namely their position and clock states, may not be known a priori, and must be estimated. This estimation problem is analogous to the simultaneous localization and mapping (SLAM) problem in robotics. Both problems ask if it is possible for an agent to start at an unknown location in an unknown environment and then to incrementally build a map of the environment while simultaneously localizing itself within this map. However, in contrast to the static environmental map of the typical SLAM problem, the SOP signal map is more complex, as the SOP signal map is dynamic and stochastic. Specifically, for pseudorange-only observations, one must estimate not only the position states, but also the clock states of both the receiver and the SOPs.

A mobile receiver, whether hand-held or vehicle-mounted, has access to N Global Positioning System (GPS) satellite vehicle (SV) observables, M unknown terrestrial SOPs, and IMU measurements, which are used to estimate the receiver's states, namely its position, velocity, clock bias, and clock drift, and the SOPs' states, namely their positions, clock biases, and clock drifts. When GPS pseudoranges become unavailable, the receiver continues drawing pseudorange observations from the SOP transmitters. The receiver continues navigating by fusing the SOP pseudoranges with IMU measurements through a dynamic estimator, which simultaneously maps the SOPs' states and localizes the receiver in that map. The subject matter described herein addresses uncertainty bounds of the receiver's state estimates, including (1) how the uncertainty bounds affected by varying the number of exploited SOPs, and (2) how sensitive the uncertainty bounds are to the stability of the SOPs' oscillators.

Each SOP transceiver 160 is assumed to emanate from a spatially stationary terrestrial transmitter, and its state vector will consist of its 3-dimensional (3D) position states $$r_{sop} \triangleq [x_{sop}, y_{sop}, z_{sop}]^T$$

and clock states $$x_{clk,sop} \triangleq c[\delta t_{sop}, \dot{\delta} t_{sop}],$$

where c is the speed of light, $\delta t_{sop}$ is the clock bias, and $\dot{\delta} t_{sop}$ is the clock drift. The SOP's discretized dynamics are given by $x_{sop}(k+1) = F_{sop} x_{sop}(k) + w_{sop}(k)$, k=1, 2, ..., where $$x_{sop} = [r_{sop}^T, x_{clk,sop}^T]^T \in \mathbb{R}^{5 \times 1},$$

$$F_{sop} = \mathrm{diag}[I_{3 \times 3}, F_{clk}],$$

$w_{sop}$ is the process noise, which is modeled as a discrete-time (DT) zero-mean white noise sequence with covariance $Q_{sop} = \mathrm{diag}[0_{3 \times 3}, Q_{clk,sop}]$, and $$F_{clk} = \begin{bmatrix} 1 & T \\ 0 & 1 \end{bmatrix}, Q_{clk,sop} = \begin{bmatrix} S_{\tilde{w}_{\delta t_{sop}}} T + S_{\tilde{w}_{\dot{\delta} t_{sop}}} \frac{T^3}{3} & S_{\tilde{w}_{\dot{\delta} t_{sop}}} \frac{T^2}{2} \\ S_{\tilde{w}_{\dot{\delta} t_{sop}}} \frac{T^2}{2} & S_{\tilde{w}_{\dot{\delta} t_{sop}}} T \end{bmatrix},$$

where T is the constant sampling interval. The terms $$S_{\tilde{w}_{\delta t_{sop}}} \text{ and } S_{\tilde{w}_{\dot{\delta} t_{sop}}}$$

are the clock bias and drift process noise power spectra, respectively, which can be related to the power-law coefficients, $\{h_\alpha\}_{\alpha=-2}^{2}$, which have been shown through laboratory experiments to characterize the power spectral density of the fractional frequency deviation of an oscillator from nominal frequency according to $$S_{\tilde{w}_{\delta t_{sop}}} \approx \frac{h_0}{2} \text{ and } S_{\tilde{w}_{\dot{\delta} t_{sop}}} \approx 2\pi^2 h_{-2}.$$

Each SOP transceiver 160 is assumed to emanate from a spatially stationary terrestrial transmitter, and its state vector will consist of its 3D position states $$x_{clk,r} \triangleq c[\delta t_r, \dot{\delta} t_r],$$

such that $$x_r(k) = [x_B(k)^T, x_{clk,r}^T(k)]^T \in \mathbb{R}^{18}.$$

The INS 16-state vector is $$x_B(k) = [{}_G^{B_k}\bar{q}^T, r_r^T(k), v_r^T(k), b_g^T(k), b_a^T(k)],$$

where $r_r$ and $v_r$ are the three-dimensional position and velocity, respectively, of the body frame expressed in a global frame, e.g., the Earth-centered Earth-fixed (ECEF) frame; $b_g$ and $b_a$ are the gyroscope and accelerometer biases, respectively; and ${}_G^{B_k}\bar{q}$ is the unit quaternion in vector-scalar form which represents the orientation of the body frame at time step k with respect to a global frame.

The orientation of the INS will evolve in DT according to $${}_G^{B_{k+1}}\bar{q} = {}_{B_k}^{B_{k+1}}\bar{q} \otimes {}_G^{B_k}\bar{q},$$

where ${}_{B_k}^{B_{k+1}}\bar{q}$ represents the relative rotation in the body frame from time step k to k+1, and $\otimes$ is the quaternion multiplication operator. The unit quaternion ${}_{B_k}^{B_{k+1}}\bar{q}$ is the solution to the differential equation $${}_{B_k}^{B_t}\dot{\bar{q}} = \frac{1}{2} \begin{bmatrix} -\lfloor {}^B\omega(t) \times \rfloor & {}^B\omega(t) \\ -{}^B\omega(t) & 0 \end{bmatrix} {}_{B_k}^{B_t}\bar{q} \quad t \in [t_k, t_{k+1}]$$

where $t_k \triangleq kT$. The vector ${}^B\omega$ is the three dimensional rotational rate vector, whereas the matrix $\lfloor {}^B\omega(t) \times \rfloor$ is the skew symmetric matrix whose entries are the components of ${}^B\omega$. The velocity will evolve in time according to the integration $$v_r(k+1) = v_r(k) + \int_{t_k}^{t_{k+1}} {}^Ga(\tau)d\tau$$

where ${}^Ga$ is the three dimensional acceleration of the IMU in the global frame. The position will evolve in time according to the integration $$r_r(k+1) = r_r(k) + \int_{t_k}^{t_{k+1}} v_r(\tau)d\tau.$$

The evolution of $b_g$ and $b_a$ will be modeled as random walk processes, i.e., $$\dot{b}_a = w_a \text{ and } \dot{b}_g = w_g \text{ with } \mathbb{E}[w_g] = \mathbb{E}[w_a] = 0,$$
$$\text{cov}[w_g] = \sigma_{w_g}^2 I_3, \text{ and } \text{cov}[w_a] = \sigma_{w_a}^2 I_3.$$

The receiver's clock states will evolve in time according to $$x_{clk,r}(k+1) = F_{clk} x_{clk,r}(k) + w_{clk}(k),$$

where $w_{clk}$ is the process noise vector, which is modeled as a DT zero-mean white noise sequence with covariance $Q_{clk,r}$, which is identical to $Q_{clk,sop}$, except that $S_{\tilde{w}_{\delta t_{sop}}}$ and $S_{\tilde{w}_{\delta t_{sop}}}$ are now replaced with receiver-specific spectra, $S_{\tilde{w}_{\delta t_r}}$ and $S_{\tilde{w}_{\delta t_r}}$ respectively.

The IMU contains a triad-gyroscope and triad-accelerometer that produce measurements $$z_{imu} = [\omega_{imu}^T, a_{imu}^T]^T$$

modeled as $$\omega_{imu} \triangleq {}^B\omega + b_g + n_g$$
$$n_{imu} = R\begin{bmatrix} B_k \\ C \end{bmatrix} \bar{q} ({}^G a - {}^G g) + b_a + n_a,$$

where $R[\bar{q}]$ is the equivalent rotation matrix of $\bar{q}$, ${}^G g$ is the acceleration due to gravity in the global frame, and $n_g$ and $n_a$ are measurement noise vectors which are modeled as zero-mean white noise sequences with covariances $\sigma g^2 I_3$ and $\sigma_a^2 I_3$, respectively The pseudorange observation made by the receiver on the $m^{th}$ SOP, after discretization and mild approximations, is related to the receiver's and SOPs' states by $$z_{sop_m} = \|r_r - r_{sop_m}\|_2 + c \cdot [\delta t_r - \delta t_{sop_m}] + v_{sop_m}. \quad (1)$$

where $v_{sop_m}$ is modeled as a DT zero-mean white Gaussian sequence with variance $\sigma_{sop_m}^2$. The pseudorange observation made by the receiver on the $n^{th}$ GNSS SV, after compensating for ionospheric and tropospheric delays is related to the receiver states by $$z_{sv_n} = \|r_r - r_{sv_n}\|_2 + c \cdot [\delta t_r - \delta t_{sv_n}] + v_{sv_n}, \quad (2)$$

where $$z_{sv_n} \triangleq z'_{sv_n} - \delta t_{iono} - \delta t_{tropo}, \delta t_{iono} \text{ and } \delta t_{tropo}$$

are the ionospheric and tropospheric delays, respectively, $z'_{sv_n}$ is the uncorrected pseudorange, and $v_{sv_n}$ is modeled as a DT zero-mean white Gaussian sequence with variance a $\sigma_{sv_n}^2$.

Figure 2:
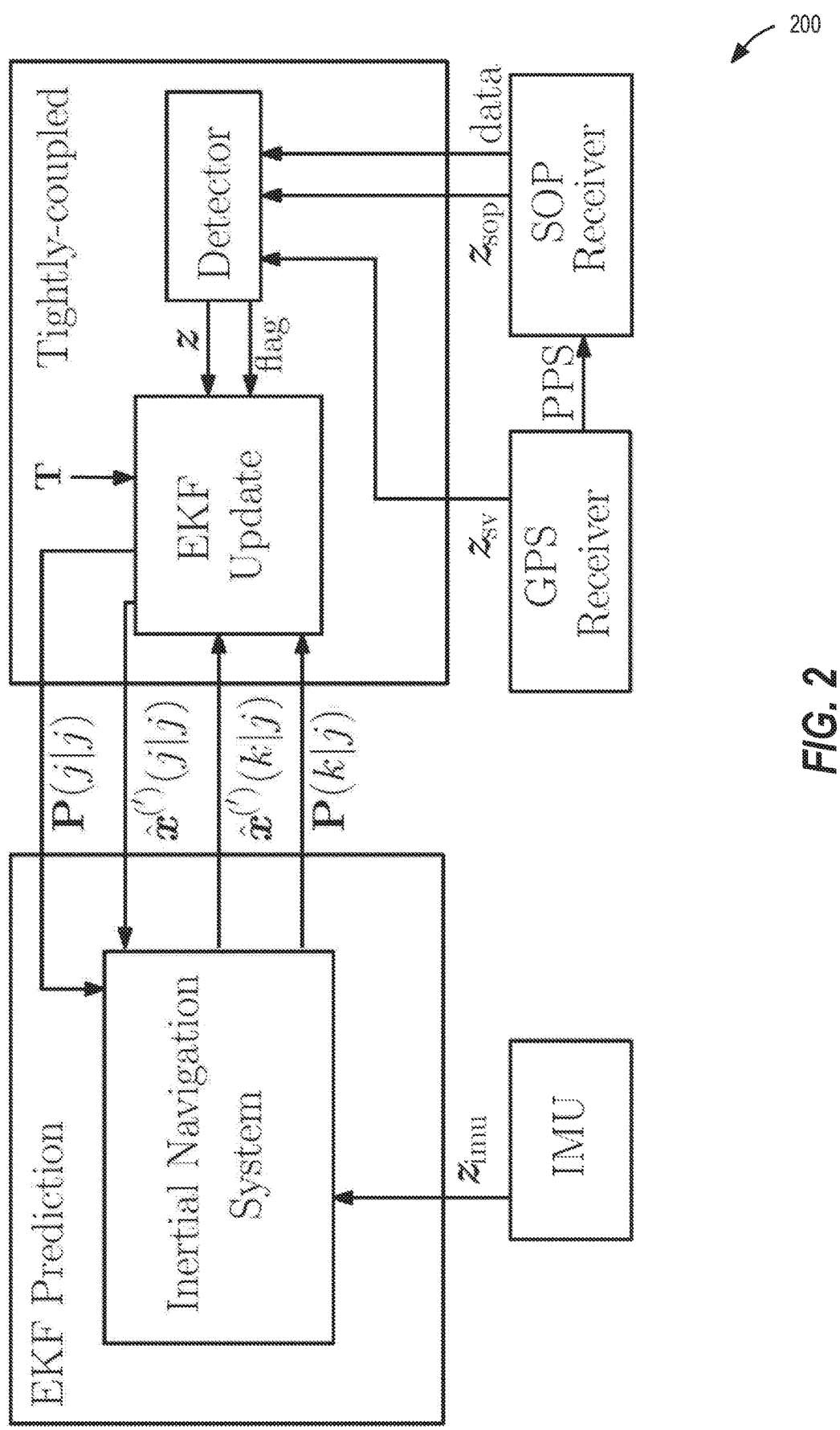
FIG. 2 is a block diagram of a SOP-aided INS framework, in accordance with at least one embodiment.

FIG. 2 is a block diagram of a SOP-aided INS framework 200, in accordance with at least one embodiment. The SOP-aided INS framework 200 may be implemented on a navigating vehicle equipped with a GNSS-aided INS and a receiver capable of producing pseudoranges to M unknown SOPs. Using the SOP-aided INS framework 200, when GNSS pseudoranges are available, SOP pseudoranges will supplement the GNSS-aided INS to improve the accuracy of the navigation solution. When GNSS pseudoranges become unavailable, SOP pseudoranges will be used exclusively as an aiding source to correct the accumulating errors of the INS. To exploit SOPs for navigation, their states must be known. However, in many practical scenarios the SOP transmitter positions are unknown. Furthermore, each SOP clock states are dynamic and stochastic, and are continuously estimated. The SOP-aided INS framework 200 adapts a SLAM-type strategy that operates in a mapping phase when GNSS pseudoranges are available and a SLAM phase when GNSS pseudoranges are unavailable. In particular, the detector flag indicates if the SOP-aided INS operates in the mapping phase:

$$\hat{x}(\cdot) \triangleq \hat{x} \text{ and } P \triangleq P_x;$$

or the SLAM phase:

$$\hat{x}(\cdot) \triangleq \hat{x}' \text{ and } P \triangleq P_{x'}.$$

To correct INS errors using SOP pseudoranges, an extended Kalman filter (EKF) framework similar to a traditional tightly-coupled GNSS-INS integration strategy is adapted, with the added complexity that the SOPs' states, denoted $\{x_{sop_m}\}_{m=1}^M$, are simultaneously estimated alongside the navigating vehicle's states. In an example, GNSS pseudoranges are available during $t \in [0, t_0)$ (mapping phase) and unavailable during $t \in [t_0, \infty)$ (SLAM phase), where $t_0$ is the instant GNSS pseudoranges become unavailable. During the mapping phase, the EKF produces an estimate $$\hat{x}(k|j) \triangleq x \text{ and } P \triangleq P$$

of $x(k)$, and an associated estimation error covariance $$P_x(k|j) \triangleq \mathbb{E}[\tilde{x}(k|j)\tilde{x}^T(k|j)]$$

where $$x \triangleq [x_r^T, x_{sop_1}^T, \dots, x_{sop_M}^T]^T \in \mathbb{R}^{(18+5M)} z \triangleq [z_{sv}^T, z_{sop}^T]^T$$

$$z_{sv} = [z_{sv_1}, \dots, z_{sv_N}]^T, z_{sop} = [z_{sop_1}, \dots, z_{sop_M}]^T,$$

$k \ge j$, and $j$ is the last time step an INS-aiding source was available. The EKF error state is defined as $$\tilde{x} \triangleq [\tilde{x}_B^T, \tilde{x}_{clk,r}^T, \tilde{r}_{sop_1}^T, \tilde{x}_{clk,sop_1}^T, \dots, \tilde{r}_{sop_M}^T, \tilde{x}_{clk,sop_M}^T]^T \quad (3)$$

where $$\tilde{x}_B = [\tilde{\theta}^T \tilde{r}_r^T \tilde{v}^T \tilde{b}_g^T \tilde{b}_a^T]^T \in \mathbb{R}^{15}.$$

The position, velocity, and clock errors are defined as the standard additive error, e.g., $\tilde{r}_{sop_1} \triangleq r_{sop_1} - \hat{r}_{sop_1}$. The orientation error is related through the quaternion product $$_G^B \bar{q} = _G^B \hat{\bar{q}} \otimes \delta \bar{q},$$

where the error quaternion $\delta \bar{q}$ is the small deviation of the estimate $_G^B \hat{\bar{q}}$ from the true orientation $_G^B \bar{q}$ and is given by $$\delta \bar{q} = \left[ \frac{1}{2} \tilde{\theta}^T, \sqrt{1 - \frac{1}{4} \tilde{\theta}^T \tilde{\theta}} \right]^T,$$

where $\tilde{\theta} \in \mathbb{R}^3$ is the 3-axis error angle vector.

During the SLAM phase, $z_{sv}$ is no longer available, therefore, the receiver's GNSS clock states $\hat{x}_{clk,r}$ no longer need to be estimated. However, it is obvious from equation (1), that the relative biases $\Delta \delta t_m \triangleq \delta t_r - \delta t_{sop_m}$, m=1, ..., M, must be estimated to exploit $z_{sop}$ as an INS-aiding source. Therefore, at $t_0$ the states $\hat{x}_{clk,r}$ and $\{\hat{x}_{clk,sop_m}\}_{m=1}^M$ are removed from the estimator, and the relative clock state estimates $\Delta \hat{x}_{clk_m}$ are initialized as\

$$\Delta \hat{x}_{clk_m} = [\Delta \hat{\delta} t_m, \Delta \hat{\dot{\delta}} t_m]^T, m=1, \ldots, M \quad (4)$$

where $$\Delta \hat{\delta} t_m \triangleq \hat{\delta} t_r - \hat{\delta} t_{sop_m}, \Delta \hat{\dot{\delta}} t_r - \Delta \hat{\dot{t}}_{sop_m}.$$

The estimation error of the new state vector x' and the corresponding estimation error covariance are initialized according to $$\tilde{x}' = T\tilde{x} \in \mathbb{R}^{(15+5M)},$$

$$P_{x'} = TP_x T^T \in \mathbb{R}^{(15+5M) \times (15+5M)},$$

where $T \in \mathbb{R}^{(17+5M)(15+5M)}$ is the transformation matrix which maps $\hat{x}$ from (3) to $$\tilde{x}' = [\tilde{x}_B^T, \tilde{r}_{s_1}^T, \Delta \tilde{x}_{clk_1}^T, \ldots, \tilde{r}_{s_M}^T, \Delta \tilde{x}_{clk_M}^T].$$

Between aiding updates the INS uses $z_{imu}$ and the dynamics described above to propagate the estimate, either $\hat{x}$ or $\hat{x}'$, and produce the corresponding prediction error covariance. During the mapping phase, the one-step prediction error covariance is given by $$P_x(k+1|j) = FP_x(k|j)F^T + Q,$$

$$F \triangleq \text{diag}[\Phi_B, F_{clk}, F_{sop}, \ldots, F_{sop}],$$

$$Q \triangleq \text{diag}[Qd_B, Q_{clk,r}, Q_{sop}, \ldots, Q_{sop}]. \quad (5)$$

The propagation of $\hat{x}_B$ and calculation of the DT linearized INS state transition matrix $\Phi_B$ and process noise covariance $Qd_B$ are performed through standard INS equations. During the SLAM phase, the prediction error covariance $$P_{x'}(k+1|j)$$

has the same form as (5), except that F is replaced with $$F' \triangleq \text{diag}[\Phi_B, F_{sop}, \ldots, F_{sop}]$$

and Q is replaced with $$Q' \triangleq \text{diag}[Qd_B, Q'_{sop_1}, \ldots, Q'_{sop_M}]$$

where $$Q'_{sop_m} \triangleq \text{diag}[O_{3 \times 3}, Q_{clk_m}],$$

and $Q_{clk_m}$ is the process noise covariance of the initialized states (4) which is readily shown to be $$Q_{clk_m} = Q_{clk,r} + Q_{clk,sop_m}, m=1, \ldots, M.$$

When an INS-aiding source is available, the EKF update step will correct the INS and clock errors using the standard EKF update equations. In the mapping phase, i.e., $z = z \triangleq [z_{sv}^T, z_{sop}^T]^T$, the corresponding Jacobian is $$H = [H_{SV}^T, H_{sop}^T]^T,$$

$$H_{sv} = \begin{bmatrix} 0_{1 \times 3} & \hat{1}_{SV_1}^T & 0_{1 \times 9} & h_{clk}^T & 0_{1 \times 5M} \\ \vdots & \vdots & \vdots & \vdots & \vdots \\ 0_{1 \times 3} & \hat{1}_{SV_N}^T & 0_{1 \times 9} & h_{clk}^T & 0_{1 \times 5M} \end{bmatrix},$$

$$H_{sop} = \begin{bmatrix} 0_{1 \times 3} & \hat{1}_{sop_1}^T & 0_{1 \times 9} & h_{clk}^T & H'_{sop_1} & \cdots & 0 \\ \vdots & \vdots & \vdots & \vdots & \vdots & \ddots & \vdots \\ 0_{1 \times 3} & \hat{1}_{sop_M}^T & 0_{1 \times 9} & h_{clk}^T & 0 & \cdots & H'_{sop_M} \end{bmatrix}, \text{where}$$

$$\hat{1}_{SV_n}^T \triangleq \frac{\hat{r}_r - r_{sv_n}}{\|\hat{r}_r - r_{sv_n}\|}, h_{clk} \triangleq [1, 0]^T, \hat{1}_{sop_m} \triangleq \frac{\hat{r}_r - r_{sop_m}}{\|\hat{r}_r - r_{sop_m}\|}, \text{and}$$

$$H'_{sop_m} \triangleq [-\hat{1}_{sop_m}^T, -h_{clk}^T].$$

The update will produce the posterior estimate $\hat{x}(j|j)$ and an associated posterior estimation error covariance $P_x(j|j)$.

In the SLAM phase, only SOP pseudoranges are available, i.e., $z = z_{sop}$. The adjusted measurement Jacobian is $$H' = \begin{bmatrix} 0_{1 \times 3} & \hat{1}_{sop_1}^T & 0_{1 \times 9} & H'_{sop_1} & \cdots & 0 \\ \vdots & \vdots & \vdots & \vdots & \ddots & \vdots \\ 0_{1 \times 3} & \hat{1}_{sop_M}^T & 0_{1 \times 9} & 0 & \cdots & H'_{sop_M} \end{bmatrix}, \text{where}$$

$$H'_{sop_m} \triangleq [-\hat{1}_{sop_m}^T, h_{clk}^T].$$

The update will produce the posterior estimate $\hat{x}(j|j)$ and an associated posterior estimation error covariance $P_{x'}(j|j)$.

Figure 3:
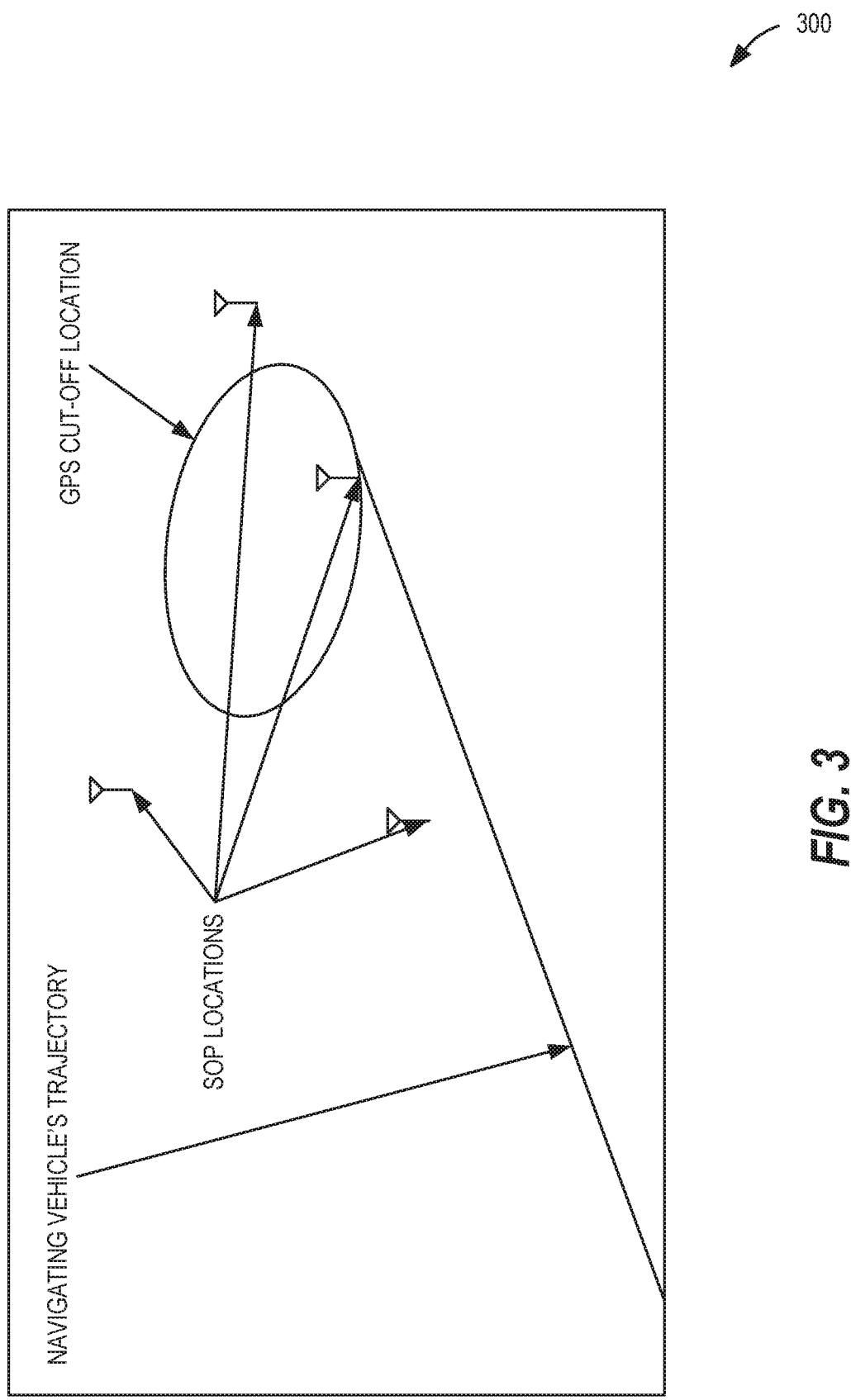
FIG. 3 is a perspective diagram of a SOP-aided INS simulated navigation, in accordance with at least one embodiment.
Figure 4A:
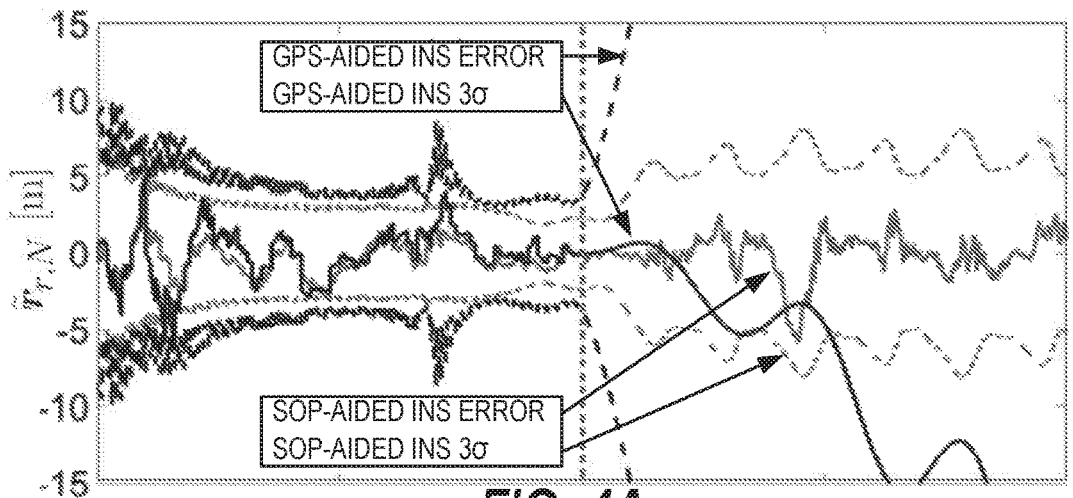
FIGS. 4A-4L are simulation results graphs, in accordance with at least one embodiment.
Figure 4B:
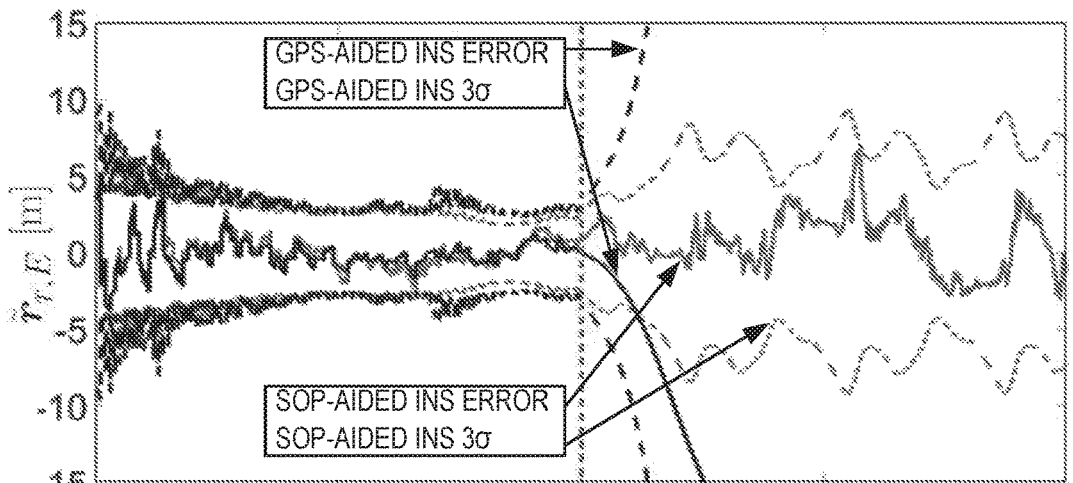
Figure 4C:
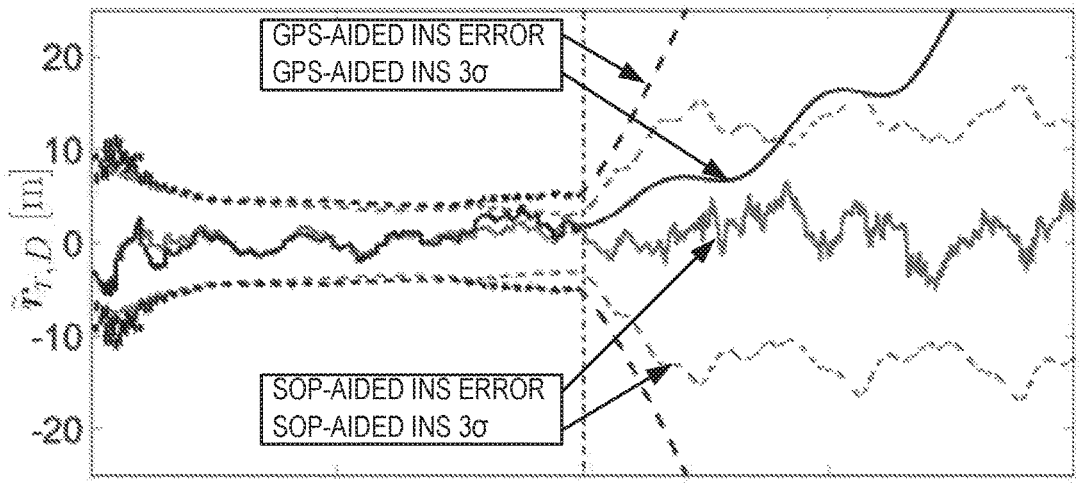
Figure 4D:
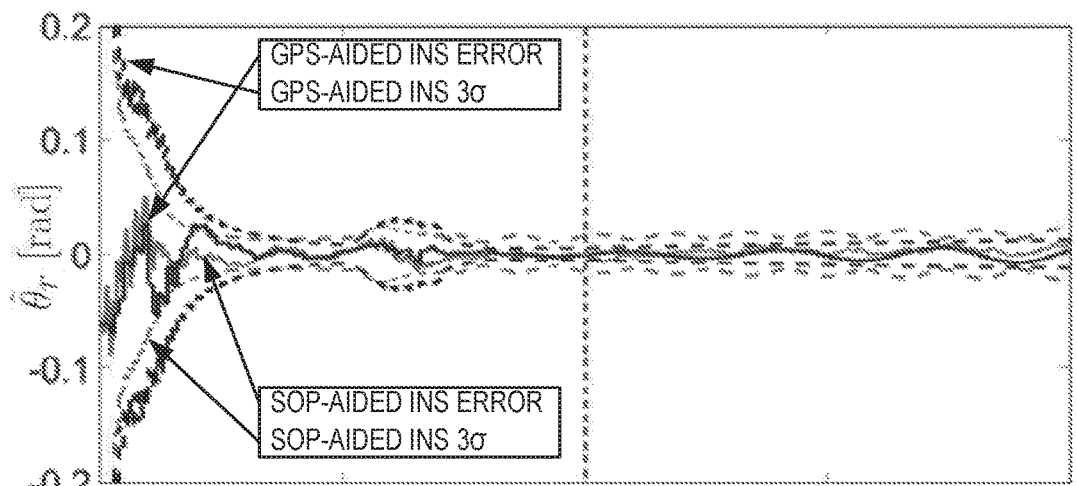
Figure 4E:
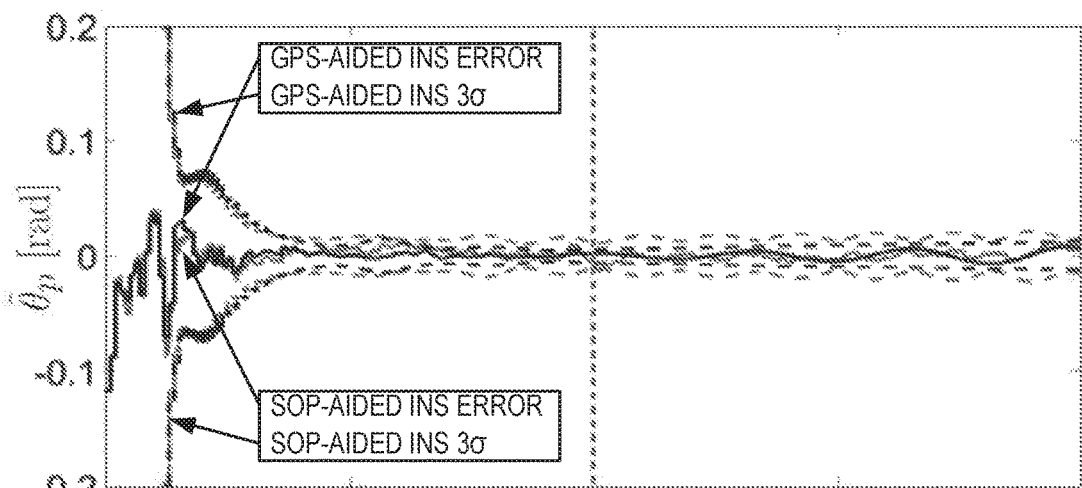
Figure 4F:
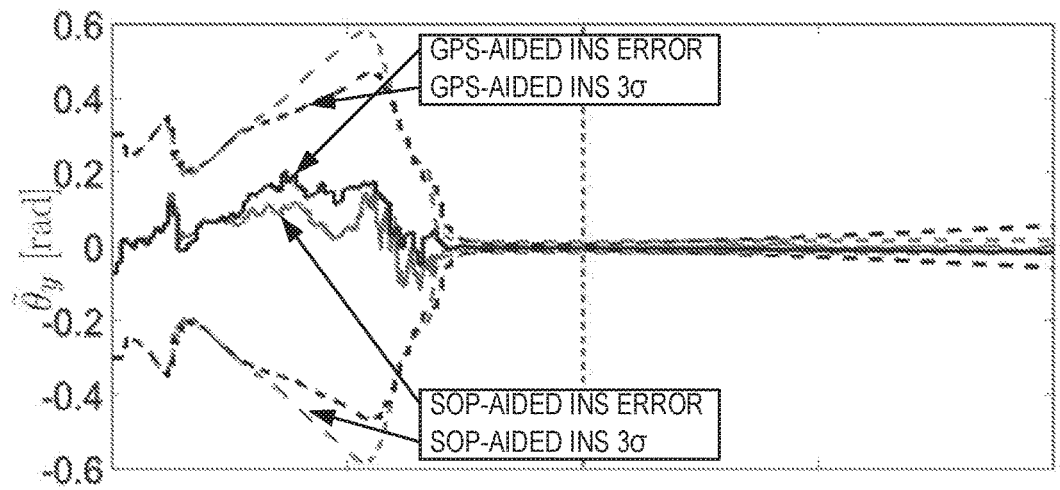
Figure 4G:
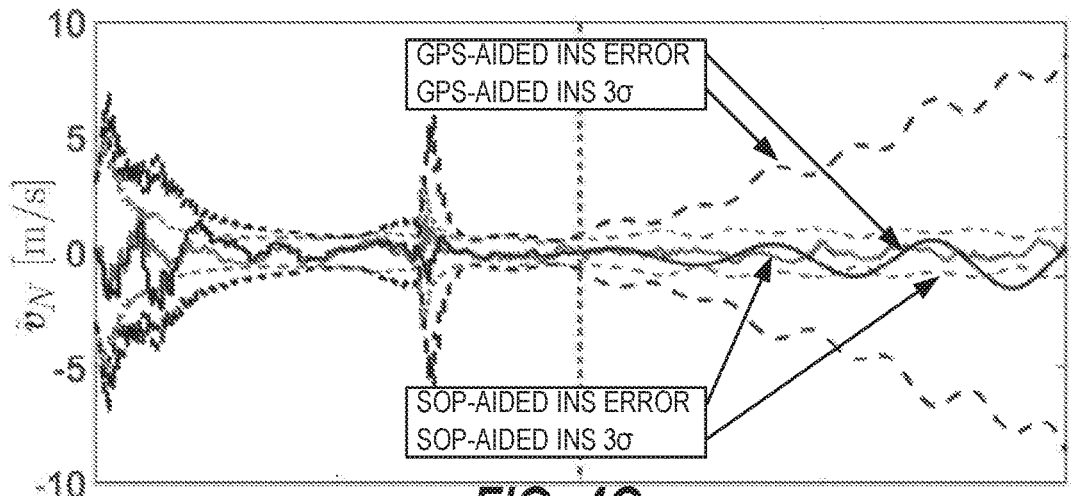
Figure 4H:
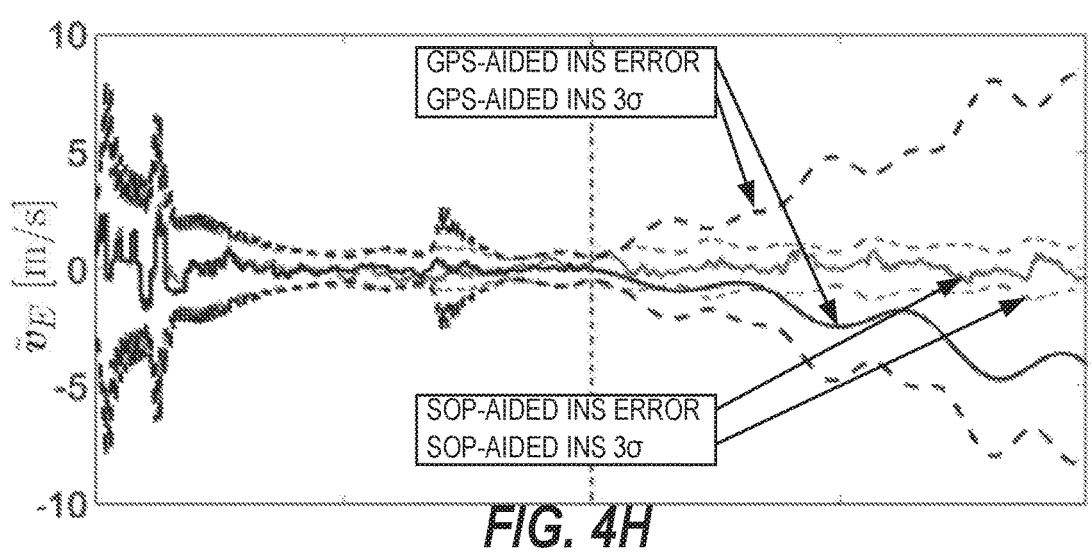
Figure 4I:
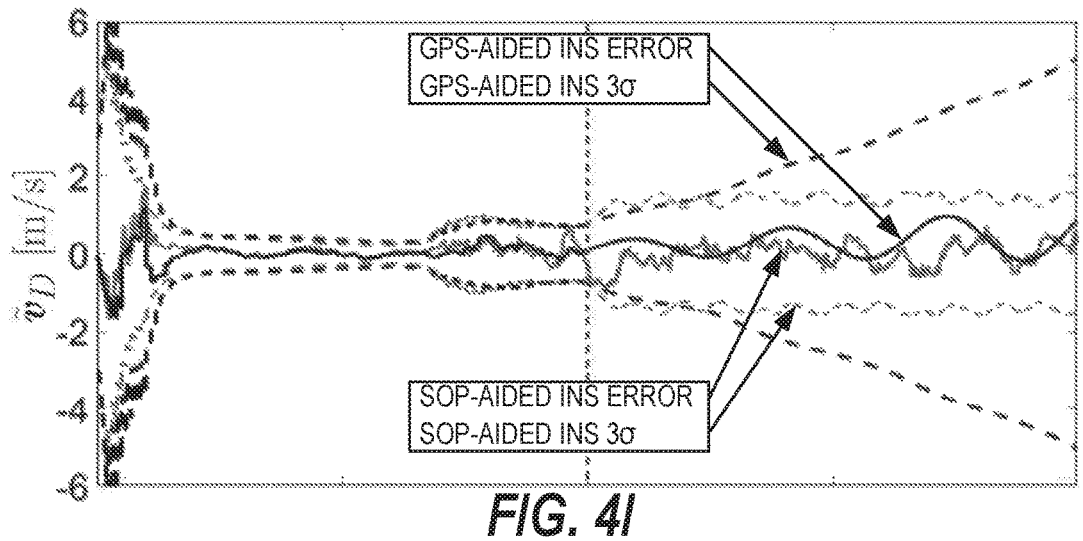
Figure 4J:
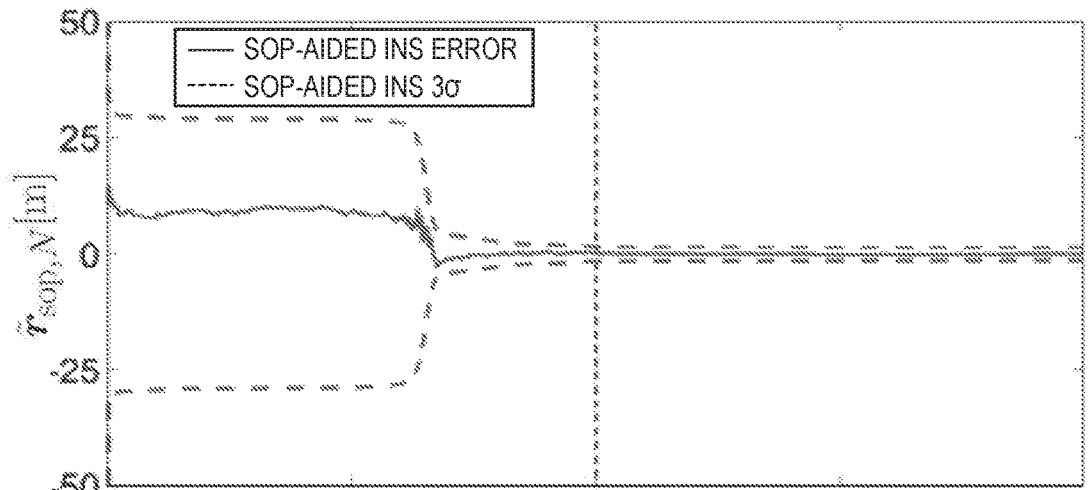
Figure 4K:
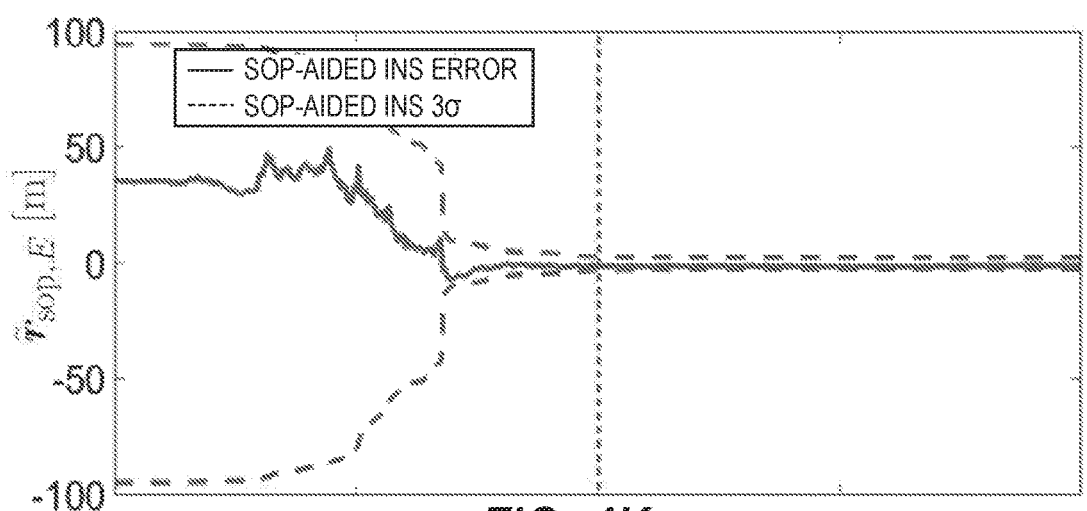
Figure 4L:
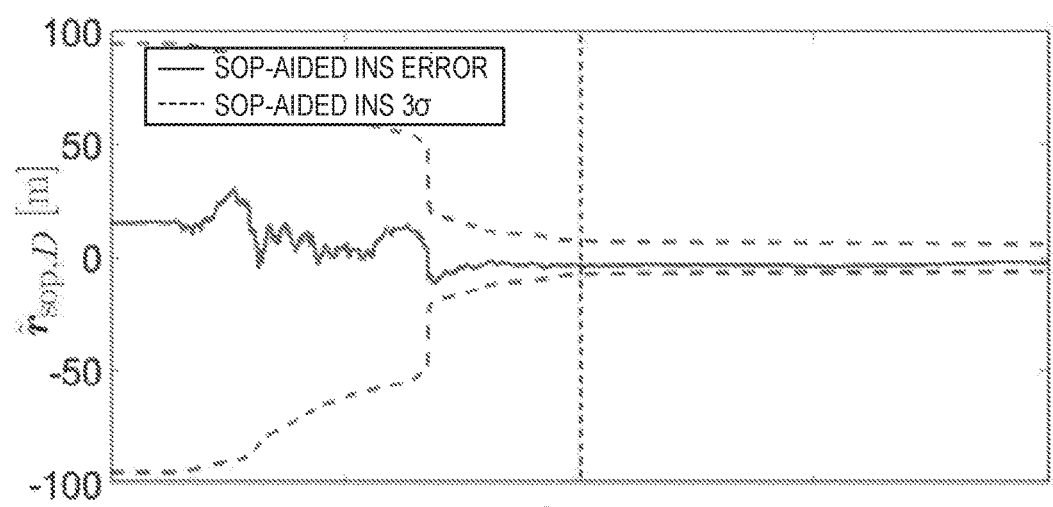

FIG. 3 is a perspective diagram of a SOP-aided INS simulated navigation 300, in accordance with at least one embodiment. The purpose of the simulated navigation 300 is to demonstrate the capabilities of the SOP-aided INS framework 200. The simulated navigation provided: (i) the "ground truth" states of the navigating vehicle, (ii) the SOPs' states, (iii) noise corrupted IMU measurements of specific force and angular rates, and (iv) noise corrupted pseudoranges to multiple SOPs and GPS SVs In an embodiment, an IMU simulator includes a MATLAB-based signal generator that models a triad gyroscope and triad accelerometer. The data $y_i(t)$ for the $i^{th}$ axis of the gyroscope and accelerometer were generated at 100 Hz according to $$y_i(t) = (1 + \epsilon_{k_i}) \cdot [u_i(t) + b_i(t) + \eta_{MA_i} + \eta_{Q_i} + \eta_{RRW_i} + \eta_{RR_i}]$$

where $u_i(t)$ is the vehicle's actual acceleration or angular rotation rate for axis i, $\lfloor_{k_i}$ is the scale factor, $b_i(t)$ is a random bias which is driven by the bias instability. $\eta_{MA_i}$ is the misalignment, $\eta_{Q_i}$ is quantization noise, $\eta_{RRW_i}$ is rate random walk, and $\eta_{RRW_i}$ is rate ramp. The magnitude of these errors and their driving statistics are determined by the grade of the IMU. In various examples, the simulation may generate consumer-grade IMU simulation data and tactical-grade IMU simulation data.

In an example, GPS L1 pseudoranges were generated at 1 Hz with (2) using SV orbits produced from Receiver Independent Exchange (RINEX) files downloaded on Jun. 1, 2016 from a Continuously Operating Reference Station (CORS) server. SOP pseudoranges were generated at 5 Hz using (1) and the SOP dynamics discussed above. The vehicle's simulated trajectory includes two straight segments, a climb, and a repeating orbit, performed over a 200 second period that were generated using a standard 6DOF kinematic model for airplanes.

Two estimation frameworks were employed to estimate the states of the navigating vehicle: (i) the SOP-aided INS equipped with a consumer-grade IMU and (ii) a traditional tightly-coupled GPS-aided INS equipped with a tactical-grade IMU. For both estimation frameworks GPS pseudoranges were set to be available for $t \in [0,100)$, and unavailable for $t \in [100,200]$. The initial errors of the navigating vehicles states were initialized according to $$\tilde{x}_r(0 \mid 0) \sim \mathcal{N}[0_{17 \times 1}, P_{\tilde{x}_r}(0 \mid 0)],$$

where $$P_{\tilde{x}_r}(0 \mid 0) \equiv diag[(10^{-2}) \cdot I_{3 \times 3}, 9 \cdot I_{3 \times 3}, I_{3 \times 3}, (10^{-4}) \cdot I_{6 \times 6}, 9, 1].$$

For the SOP-aided INS framework, the SOP state estimates were initialized according to $$\hat{x}_{sop_m}(0 \mid 0) \sim \mathcal{N}[x_{sop_m}(0), P_{sop}(0 \mid 0)],$$

for $m = 1, \ldots, M$, where $$x_{sop_m}(0) \equiv [r_{sop_m}^T, 10^4, 10]^T, P_{sop}(0 \mid 0)$$
$$\equiv (10^4) \cdot diag[1, 1, 1, .1, 0.1, 0.01],$$

and the positions $\{r_{sop,m}\}_{m=1}^{M}$ were surveyed from SOP tower locations in downtown Los Angeles. The simulated trajectory, SOP positions, and the position at which GPS was set to become unavailable are illustrated in FIG. 3.

FIGS. 4A-4L are simulation results graphs 400, in accordance with at least one embodiment. In particular, simulation results graphs 400 show estimation error trajectories and corresponding 3σ bounds for the position, velocity, and attitude of the receiver and an example SOP's position produced by the SOP-aided INS framework. For a comparative analysis, a traditional tightly-coupled GPS-INS integration strategy with a tactical-grade IMU was used to estimate the states of the receiver. The resulting position, velocity, and attitude estimation error trajectories and corresponding 3σ bounds are plotted in FIGS. 4A-4I.

Simulation results graphs 400 show results for two simulations. In both simulations, a navigating vehicle had access to GPS pseudoranges for only the first 100 seconds while traversing the trajectory illustrated in FIG. 1. In the first simulation, a tightly-coupled GPS-INS integration strategy using a tactical-grade IMU produced the estimation error trajectories and corresponding 3σ bounds. In the second simulation, the SOP-aided INS framework produced the estimation error trajectories and corresponding 3σ bounds. Oscillations coincide with the repeating circular path of the vehicle. North, East, and down (NED) errors are shown for position and velocity. Roll, pitch, and yaw (rpy) errors are shown for the orientation.

Figure 5A:
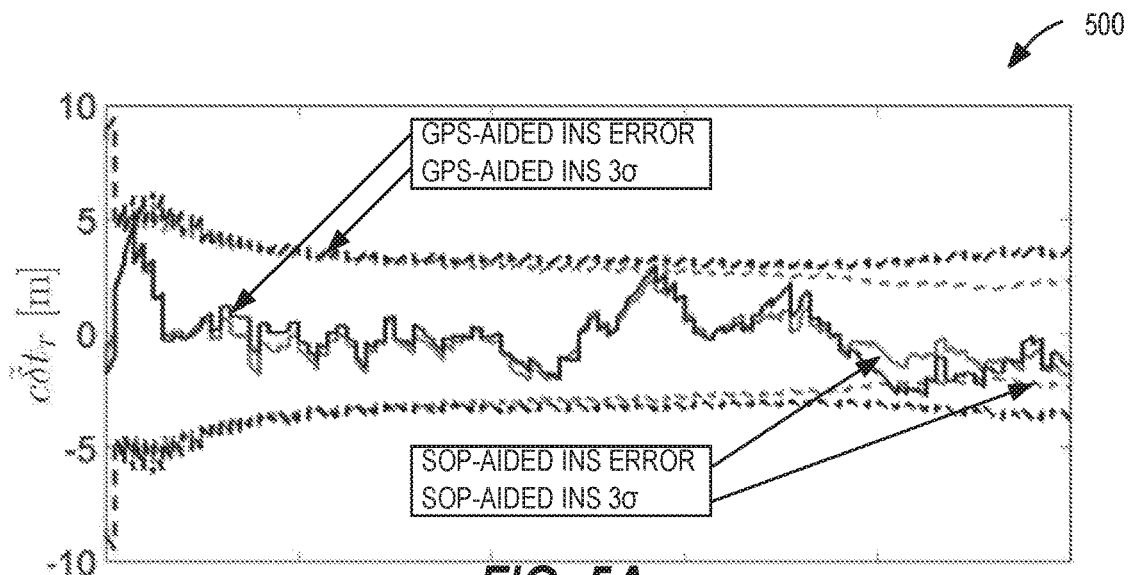
FIGS. 5A-5F are error trajectory graphs, in accordance with at least one embodiment.
Figure 5B:
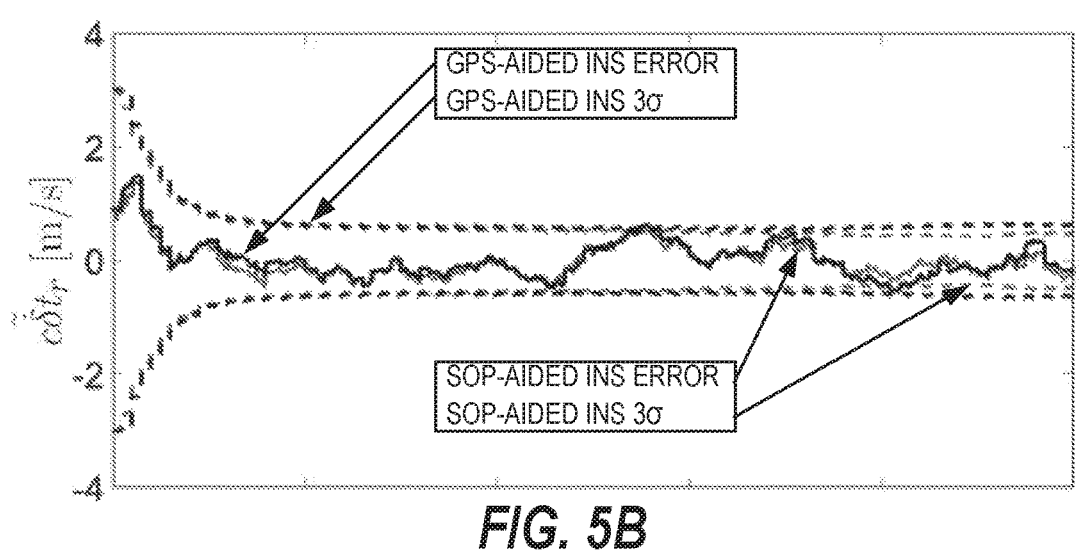
Figure 5C:
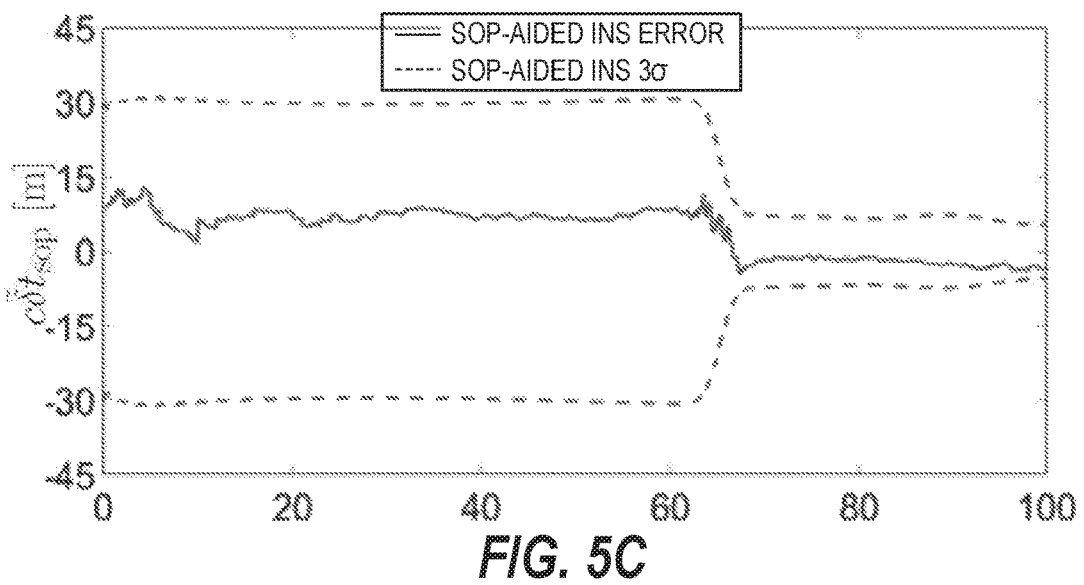
Figure 5D:
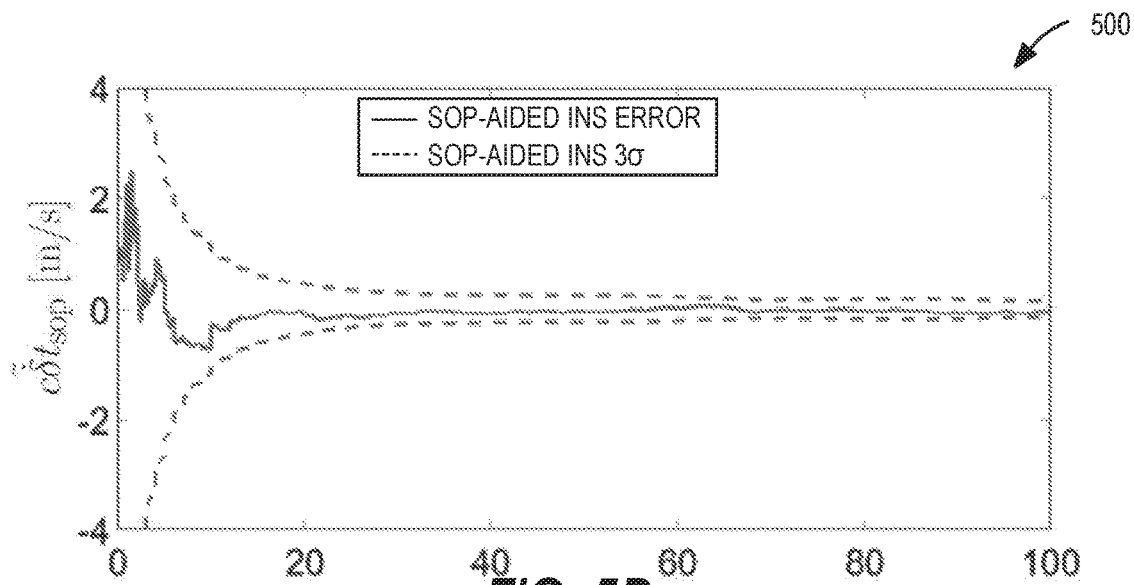
Figure 5E:
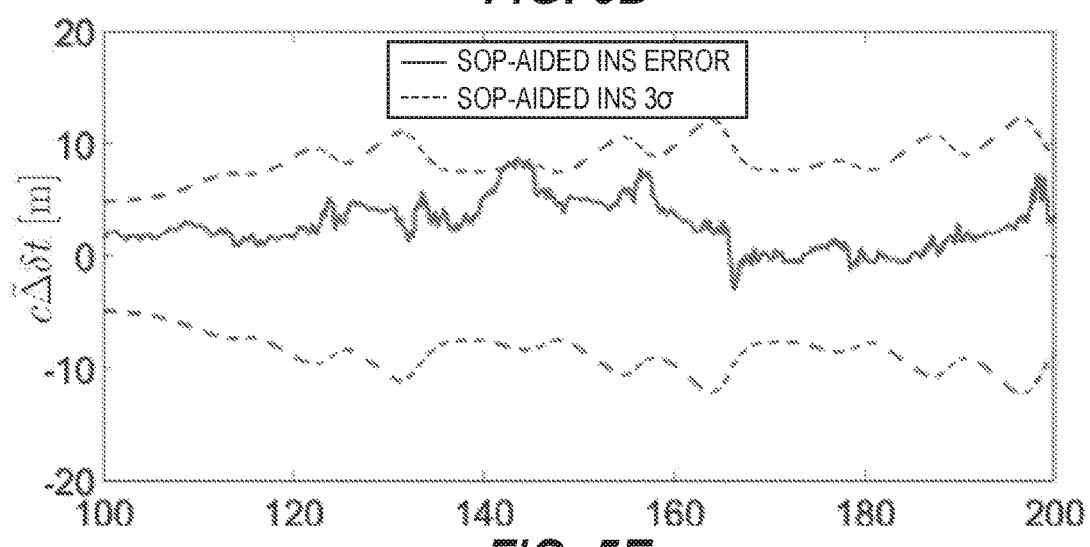
Figure 5F:
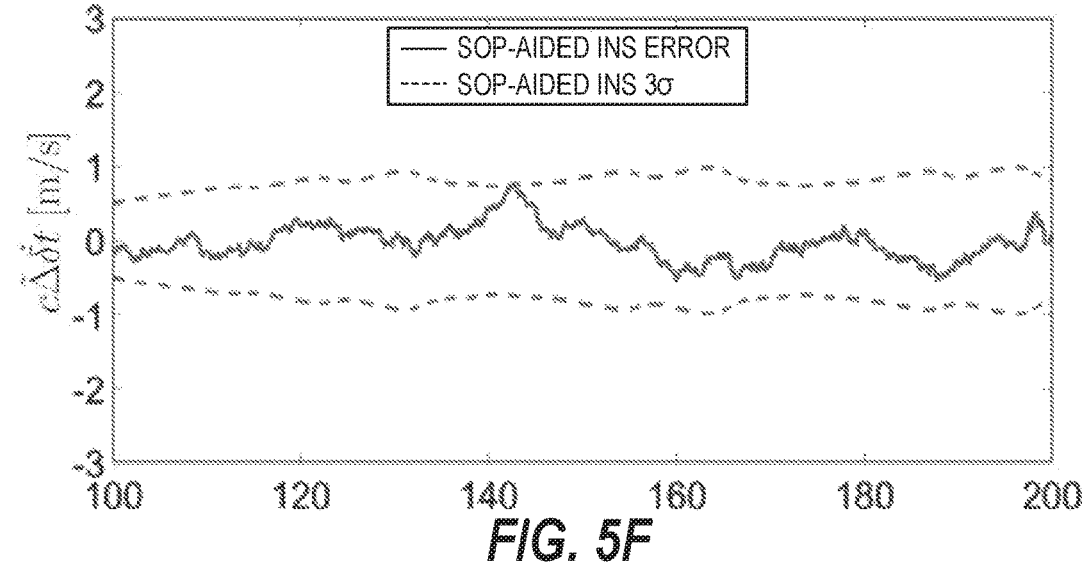

FIGS. 5A-5F are error trajectory graphs 500, in accordance with at least one embodiment. The plots in FIG. 5A and FIG. 5B correspond to the estimation errors of the receiver's clock states, whereas the plots in FIG. 5C and FIG. 5D correspond to the estimation errors of the SOPs clock states while GPS was available. FIG. 5E and FIG. 5F correspond to the estimation errors of the relative clock states that are initialized when GPS becomes unavailable, and correspond to $\Delta \hat{x}_{clk_1}$ during the SLAM phase. Oscillations coincide with the repeating circular path of the vehicle.

Simulation results graphs 400 and 500 show that when GPS pseudoranges become unavailable at t=100 seconds, the estimation error variances associated with the traditional GPS-INS integration strategy begin to diverged, and that a bound can be specified for the errors associated with the SOP-aided INS. Additionally, simulation results graphs 400 and 500 show that the SOP-aided INS with a consumer-grade IMU almost always yields lower estimation error variances when compared to the traditional GPS-INS integration strategy with a tactical-grade IMU.

Figure 6A:
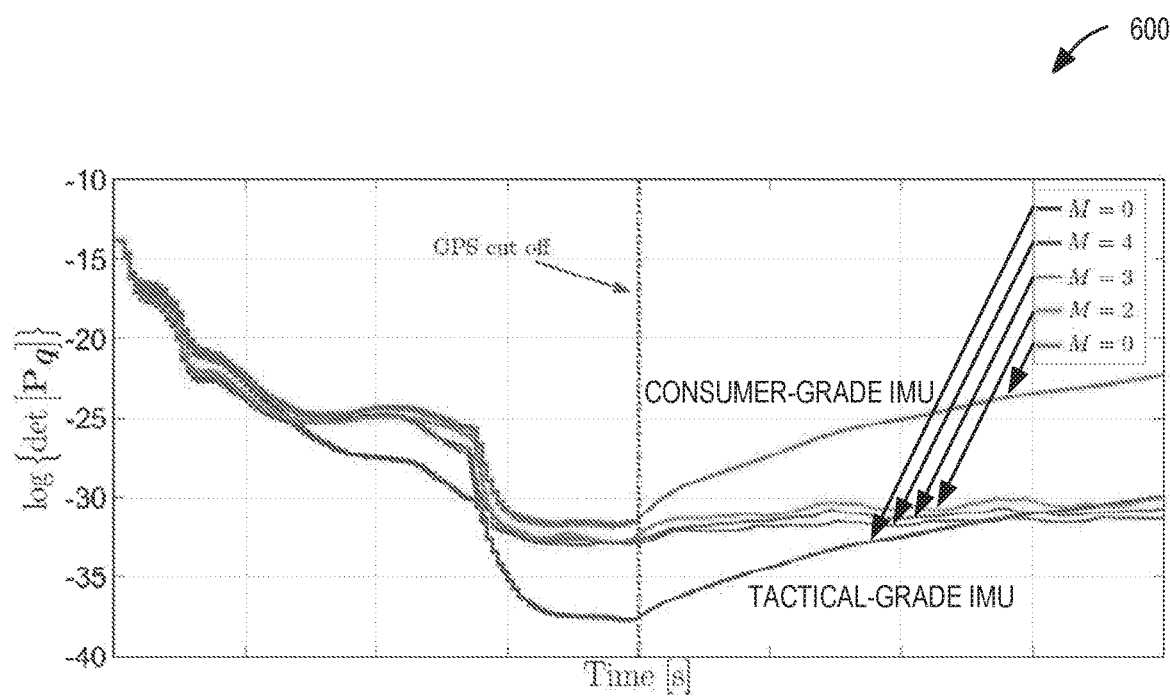
FIGS. 6A-6B depict error estimation graphs, in accordance with at least one embodiment.
Figure 6B:
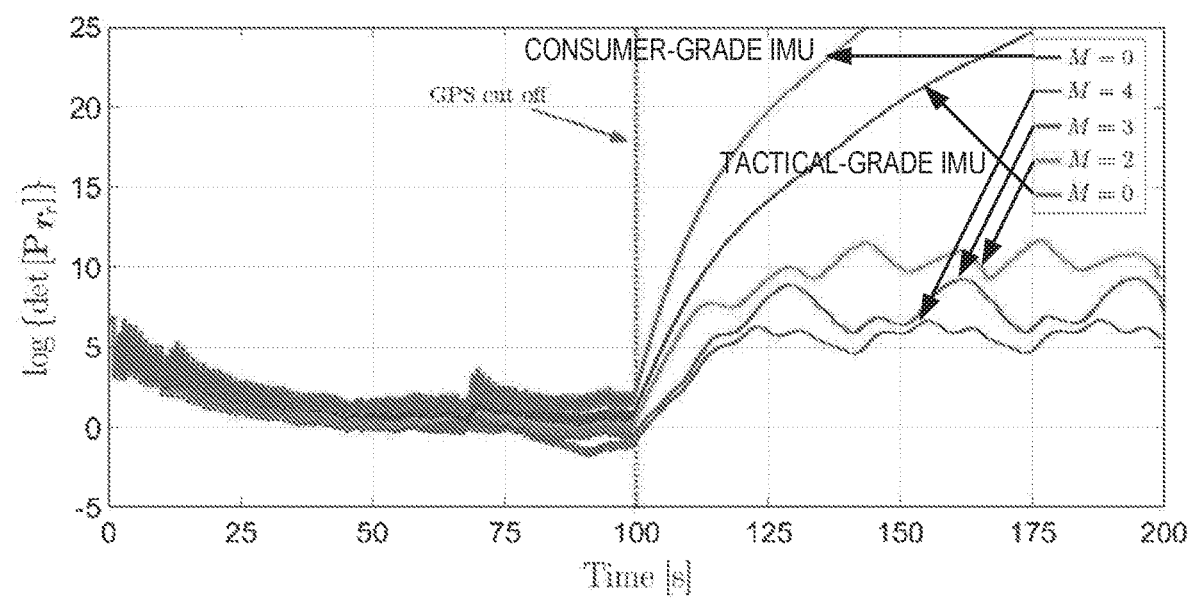
Figure 7A:
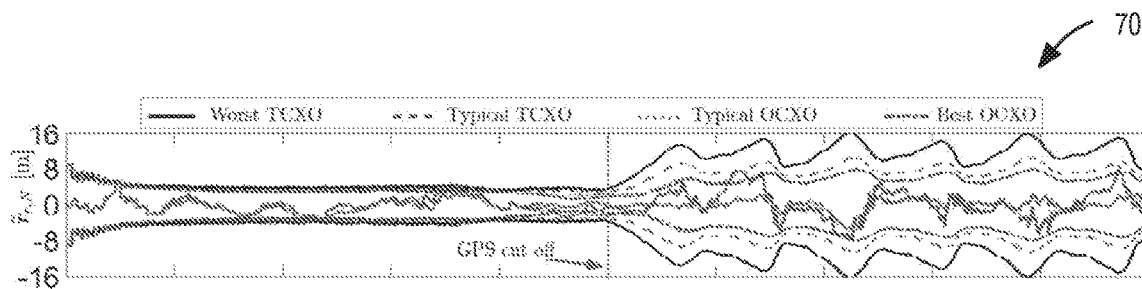
FIGS. 7A-7F depict clock-dependent error estimation graphs, in accordance with at least one embodiment.
Figure 7B:
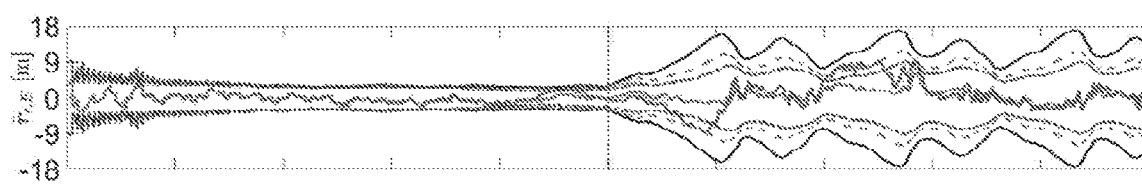
Figure 7C:
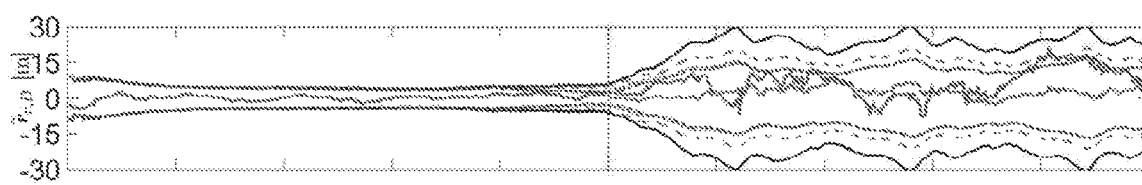
Figure 7D:
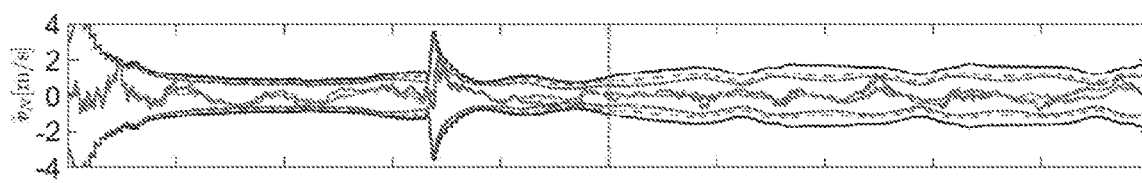
Figure 7E:
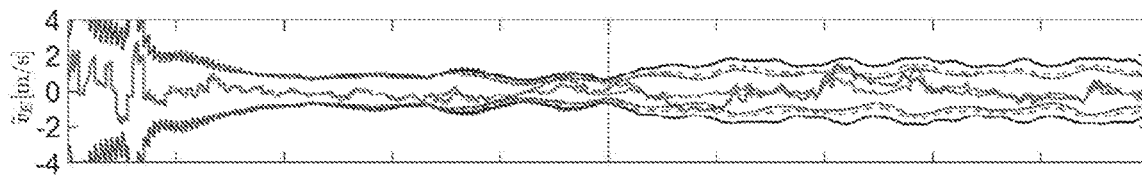
Figure 7F:
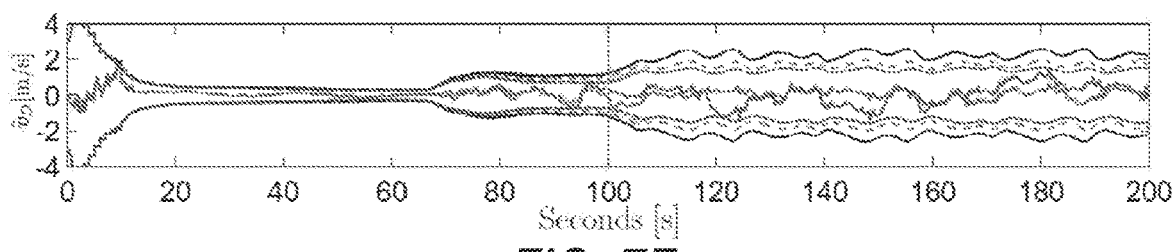

FIGS. 6A-6B depict error estimation graphs 600, in accordance with at least one embodiment. Error estimation graphs 600 were generated using a navigating vehicle that traverses the trajectory illustrated in FIG. 3. GPS pseudoranges become unavailable at 10) seconds, and the vehicle continues to navigate by fusing INS estimates and pseudoranges from A SOPs using the framework illustrated in FIG. 2. FIG. 6A and FIG. 6B correspond to the logarithm of the determinant of the estimation error covariance for attitude, and position, respectively, for exploiting a varying number of SOPs in the navigating receiver's vicinity. The two curves for M=0 correspond to a traditional tightly-coupled GPS-aided INS equipped with a tactical grade IMU and consumer-grade IMU.

To study the performance sensitivity of the SOP-aided INS framework over a varying number of SOPs, the states of the navigating vehicle, all available SOPs, and noise corrupted measurements were generated using the simulator and settings described above. Five separate simulation runs were conducted. For each simulation, the states of the navigating vehicle were estimated The first three runs employed the SOP-aided INS with a consumer grade IMU and M=2, . . . , 4 SOPs. The last two runs, employed a traditional tightly-coupled GPS-INS integration strategy (M=0) with (i) a tactical-grade IMU and (ii) a consumer-grade IMU. FIGS. 6A-6B illustrate for each run the resulting logarithm of the determinant of the estimation error covariance, which is proportional to the volume of the estimation uncertainty ellipsoid. FIG. 6A corresponds to the attitude $(\log\{det[P_{\bar{q}}]\})$, whereas FIG. 6B corresponds to the position $(\log\{det[P_{r_r}]\})$.

Error estimation graphs 600 show that the estimation uncertainties produced by the SOP-aided INS associated with both $_G^B\bar{q}$ and $r_r$ are reduced when M is increased, and the sensitivity to varying M is captured by the distance between the $\log\{det[P_{\bar{q}}]\}$ and $\log\{det[P_{r_r}]\}$ trajectories. Error estimation graphs 600 also show that although the SOP-aided INS used a consumer-grade IMU, the resulting estimation uncertainty of $r_r$ for M=2, . . . , 4 is lower when compared to the resulting estimation uncertainty produced by a traditional tightly-coupled GPS-INS using a tactical grade IMU. Error estimation graphs 600 also show that although the GPS-INS equipped with a tactical-grade IMU produces a lower estimation uncertainty of $_G^B\bar{q}$ while GPS is available, the uncertainty begins to diverge when GPS becomes unavailable, and becomes larger than the uncertainties produced by the SOP-aided INS, for which a bound may be specified for M=2, . . . , 4.

FIGS. 7A-7F depict clock-dependent error estimation graphs 700, in accordance with at least one embodiment. Clock-dependent error estimation graphs 700 were generated using a navigating vehicle that traverses the trajectory illustrated in FIG. 3. GPS pseudoranges become unavailable at 100 seconds and the vehicle continues to navigate using the framework illustrated in FIG. 2. The clock-dependent error estimation graphs 700 indicate performance characteristics of varying qualities of SOPs in particular, the SOP quality is dependent on the stability of the oscillator that is equipped on the SOP transmitter. The stability of the oscillator is characterized by the parameters of $Q_{clk,sop}$ as described above. Four simulations were conducted using the simulator and settings described above. The resulting $3\sigma$ bounds for exploiting four SOPs that were assumed to all be equipped with a worst temperature compensated crystal oscillator (TCXO), typical TCXO, typical oven-controlled crystal oscillator (OCXO), and best OCXO. FIGS. 7A-7F correspond to the $3\sigma$ bounds for exploiting SOPs equipped with a worst TCXO, typical TCXO, typical OCXO, and best OCXO. North, East, and up (NED) errors are shown. The four grades of oscillators considered and their characterizing parameters are tabulated in Table I:

TABLE I

Quality of SOPs: Oscillator Type

| Parameter | Value |
| --- | --- |
| Worst TCXO $\{h_{0,s}, h_{-2,s}\}$ | $\{2.0 \times 10^{-19}, 2.0 \times 10^{-20}\}$ |
| Typical TCXO $\{h_{0,s}, h_{-2,s}\}$ | $\{9.4 \times 10^{-20}, 3.8 \times 10^{-21}\}$ |
| Typical OCXO $\{h_{0,s}, h_{-2,s}\}$ | $\{8.0 \times 10^{-20}, 4.0 \times 10^{-23}\}$ |
| Best OCXO $\{h_{0,s}, h_{-2,s}\}$ | $\{2.6 \times 10^{-22}, 4.0 \times 10^{-26}\}$ |

The clock-dependent error estimation graphs 700 indicate that that sensitivity of the estimation performance to the quality of oscillator was minimal while GPS was available. When GPS pseudoranges are unavailable, the estimation performance is significantly more sensitive to the quality of the oscillator, and the sensitivity is captured by the distance between the $3\sigma$ trajectories. Although the uncertainty in the estimates were larger when SOPs were equipped with a worst TCXO, a bound may still be specified.

Figure 8:
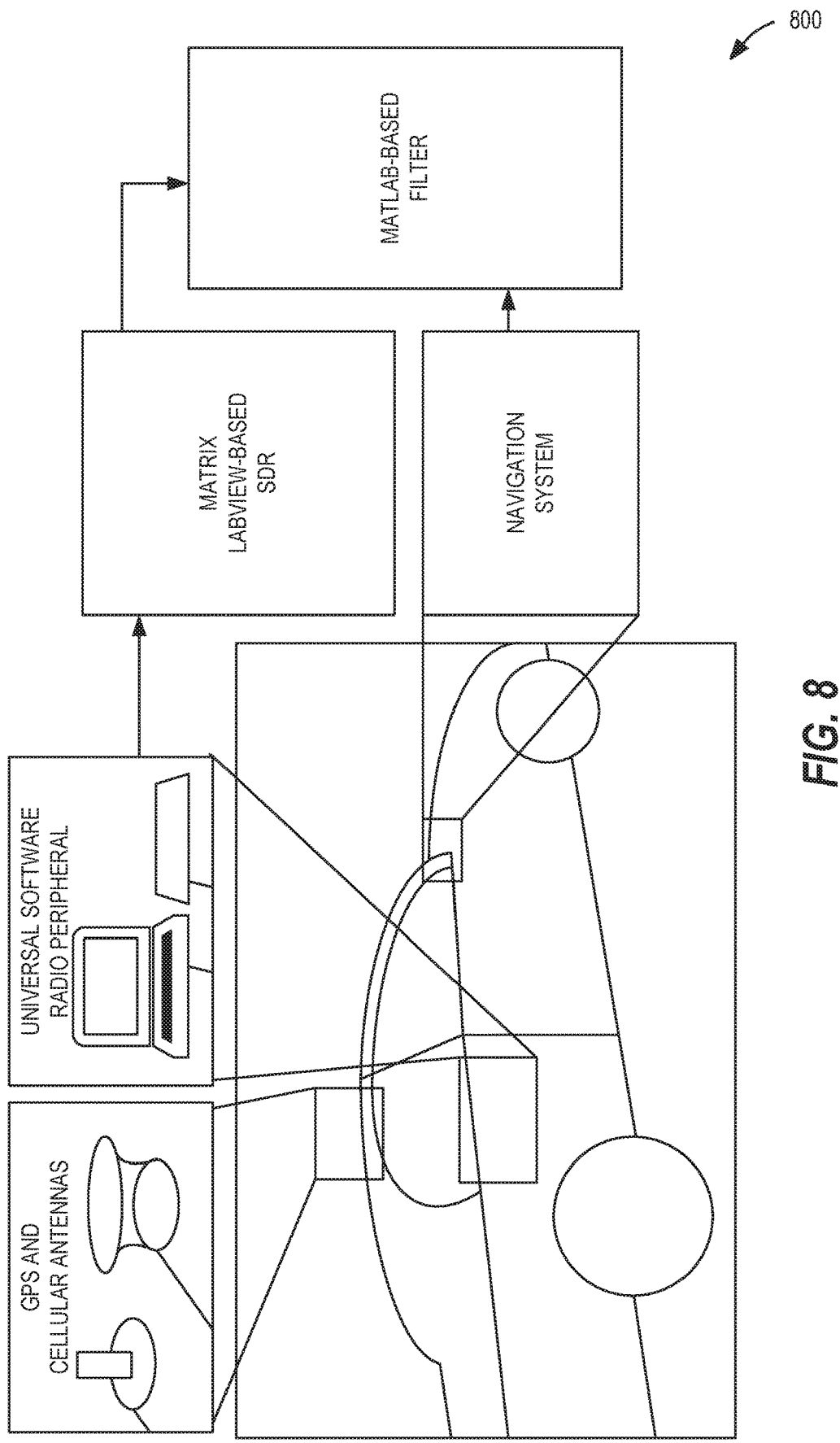
FIG. 8 is a block diagram of an experimental hardware setup, in accordance with at least one embodiment.

FIG. 8 is a block diagram of an experimental hardware setup 800, in accordance with at least one embodiment. The experimental hardware setup 800 was used to conduct a field experiment using an IMU and a software defined radio (SDR) to demonstrate the SOP-aided INS framework discussed above. The experimental hardware setup 800 includes two antennas mounted on a vehicle to acquire and track multiple GPS signals, and a cellular base transceiver station (BTS) whose signals were modulated through code division multiple access (CDMA). The GPS and cellular signals were simultaneously downmixed and synchronously sampled via a two-channel National Instruments® universal software radio peripheral (USRP). This front-end fed the data to the Multichannel Adaptive TRansceiver Information eXtractor (MATRIX) SDR, which produced pseudorange observables from all GPS L1 C/A signals in view, and the cellular BTS. The IMU data was sampled from a navigation system developed at University of California, Riverside (UCR), which is equipped with: (i) a consumer grade IMU, (ii) a tactical-grade IMU, and (iii) a u-blox-® GPS receiver.

Figure 9:
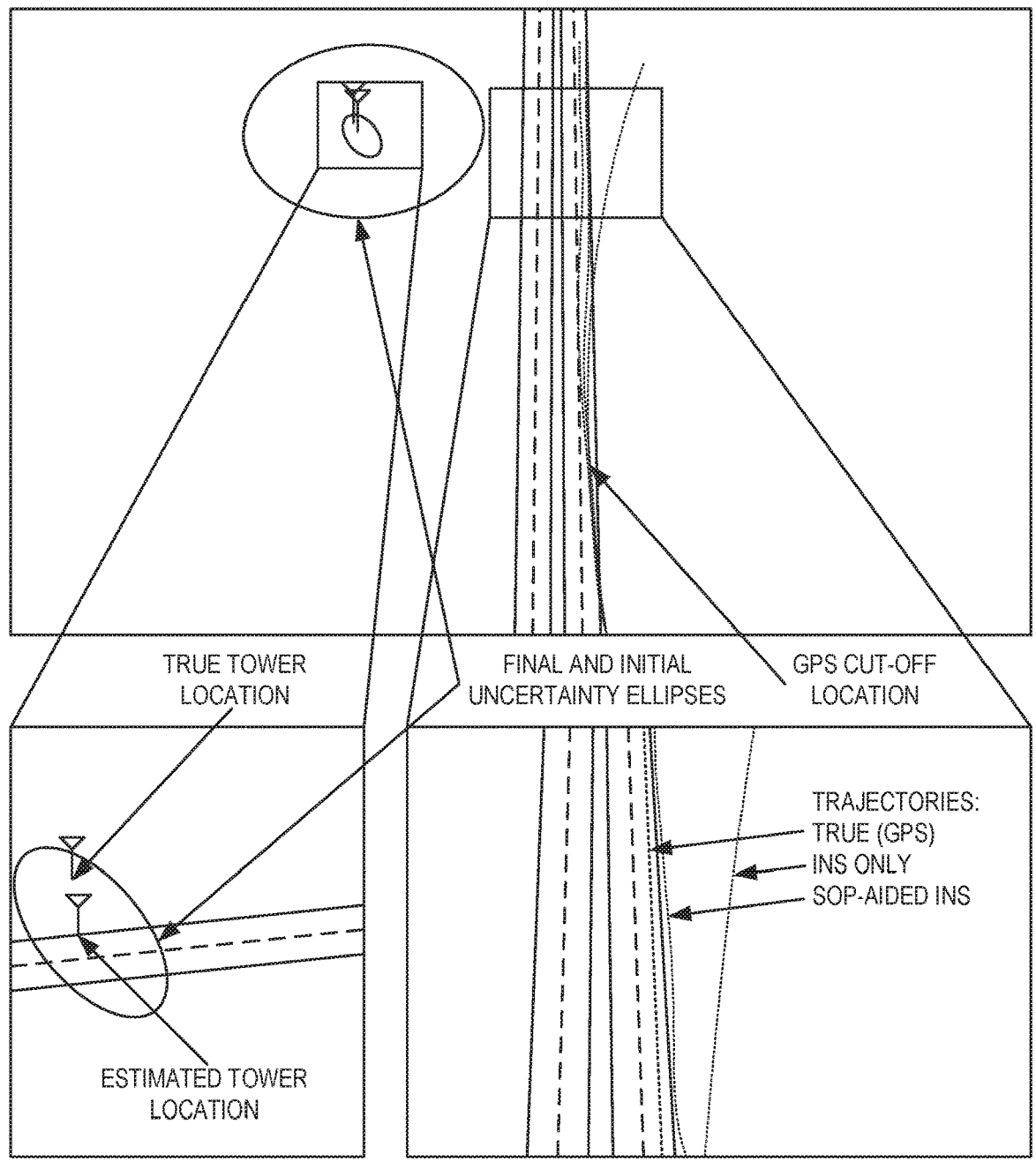
FIG. 9 is an illustration of experimental results, in accordance with at least one embodiment.

FIG. 9 is an illustration of the experimental results 900, in accordance with at least one embodiment. The experimental results 900 include results from two estimators: (i) the proposed SOP-aided INS using the consumer grade IMU and (ii) for comparative analysis, a traditional tightly-coupled GPS-INS using the consumer-grade IMU. For both estimators, GPS pseudoranges were available for only the first 16 seconds of the 30 second run. The ground truth trajectory was generated with a common GPS-INS EKF using the u-blox GPS receiver and the tactical-grade IMU. The experimental results 900 illustrate the true and estimated vehicle trajectories, the true and estimated tower locations, and the North-East 99th-percentile initial and final uncertainty ellipses. The North-East root-mean-square error (RMSE) of the traditional tightly-coupled GPS-INS's navigation solution after GPS became unavailable was 23.5 meters. The SOP-aided INS produced a trajectory estimate with an RMSE of 9.42 meters and a final BTS localization error of 15.5 meters. Although this is a significant improvement over using an INS alone, the improvement is expected to be much more significant with additional time, since the errors of the unaided INS will diverge, whereas the SOP-aided INS errors will be bounded.

Figure 10:
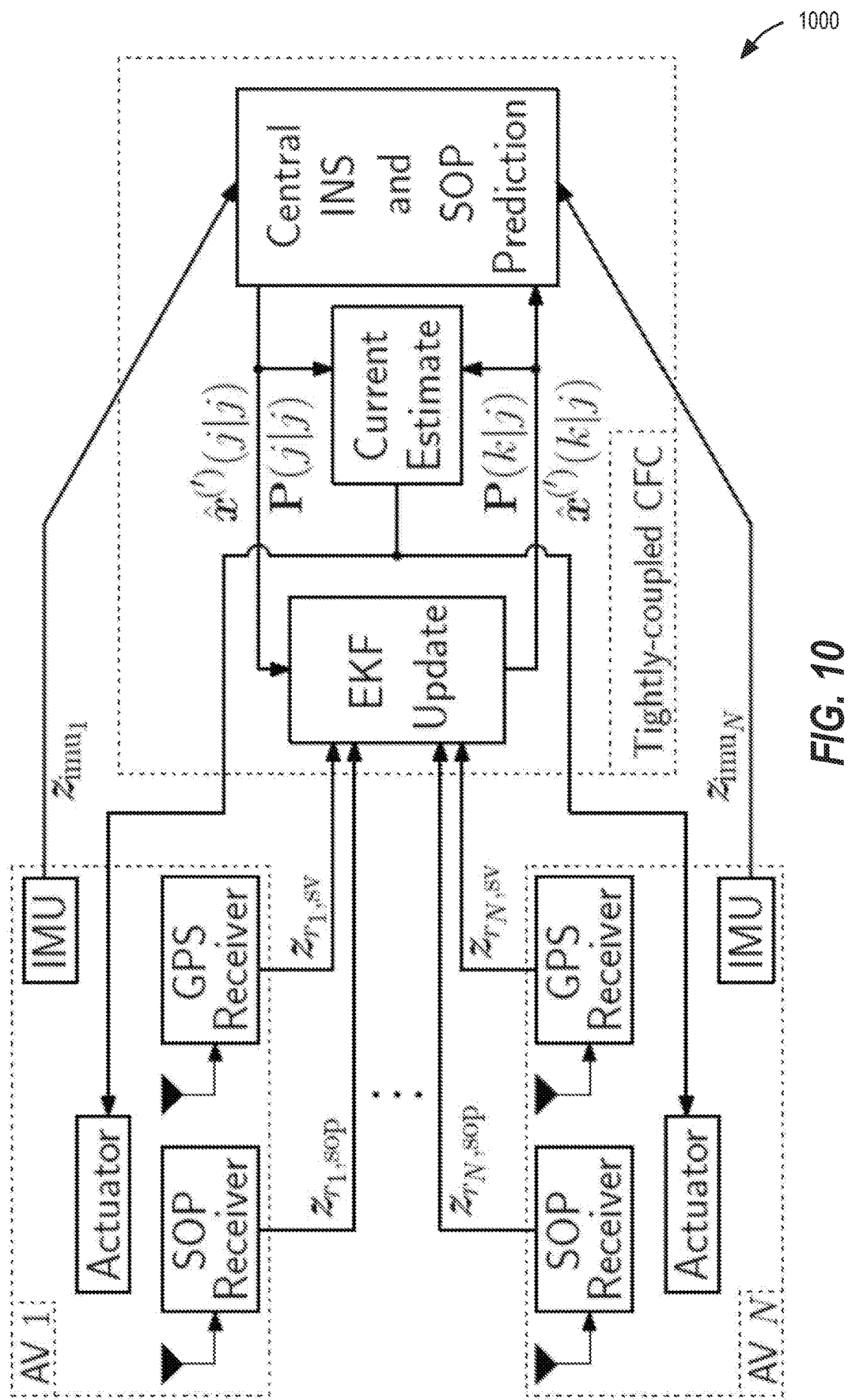
FIG. 10 is a block diagram of a collaborative SOP-aided INS framework, in accordance with at least one embodiment.

FIG. 10 is a block diagram of a collaborative SOP-aided INS framework 1000, in accordance with at least one embodiment. The collaborative SOP-aided INS framework 1000 may take advantage of information provided by multiple autonomous vehicles (AVs) with access to GNSS signals aiding their on-board INSs with GNSS pseudoranges. While navigating, AV-mounted receivers draw pseudorange observations on ambient unknown terrestrial SOPs and collaboratively estimate the SOPs' states After some time, GNSS signals become unavailable. Subsequently, the AVs exploit the SOPs to collaboratively aid their INSs. The collaborative SOP-aided INS framework 1000 may use time-of-arrival (TOA) measurements from SOPs or time-difference-of-arrival (TDOA) measurements taken with reference to a specific SOP. This framework 1000 may vary the quantity of collaborating AVs, and provides "GNSS-like" performance achieved in the absence of GNSS signals, Experimental results demonstrate multiple unmanned aerial vehicles (UAVs) collaboratively navigating exclusively with their onboard inertial measurement units (IMUs) and pseudoranges extracted from unknown terrestrial SOPs emanating from two cellular towers.

The collaborative SOP-aided INS framework 1000 uses collaborative SLAM (C-SLAM). In C-SLAM, multiple AVs share their pose estimates and observations in order to improve the quality of their individual state estimates and to build a larger and more accurate map. Multiple collaborating AVs will be estimating their states (attitude, position, velocity, clock bias, and clock drift) in a three-dimensional (3-D) environment and will make mutual observations on the dynamic and stochastic SOP map. Specifically, SOP pseudorange observations will be shared and used to analyze the TOA and TDOA.

The collaborative SOP-aided INS framework 1000 may operate within an environment that includes multiple AVs and multiple unknown SOPs. Each AV has access to GNSS SV pseudoranges, multiple unknown terrestrial SOP pseudoranges, and an onboard IMU. While GNSS pseudoranges are available, the AVs collaboratively map the SOPs, estimating the SOPs' positions, clock biases, and clock drifts. During this mode, the UAVs are navigating with a tightly-coupled GNSS-aided INS strategy. Suddenly, GNSS pseudoranges become unavailable. The AVs continue drawing pseudorange observables from the SOPs and continue estimating the SOPs' states. In this mode, the AVs switch to navigating with a collaborative tightly-coupled SOP-aided INS strategy. AVs equipped with consumer-grade IMUs navigating with the collaborative SOP-aided INS framework 1000 could achieve a performance comparable to when GNSS signals are still available.

The collaborative SOP-aided INS framework 1000 includes a centralized collaborative SOP-aided INS that produces a state estimate $\hat{x}(')$ and an estimation error covariance P. All N collaborating AVs send their IMU data $z_{imun}$, GNSS pseudoranges $z_{rn,sv}$, and SOP pseudoranges $z_{rn,sop}$ to a tightly-coupled EKF-based CFC that operates in two modes: (1) collaborative mapping mode. $\hat{x}^{(')} = \hat{x}$ and $P \equiv P_x$, where $\hat{x}$ and $P_x$ are the state estimate and the estimation error covariance, respectively, or (2) C-SLAM mode: $\hat{x}^{(')} = \bar{x}'$ and $P \equiv P_{x'}$, where $\hat{x}'$ and $P \equiv P_{x'}$ are the state estimate and the estimation error covanance, respectively.

Using the collaborative SOP-aided INS framework 1000, a bound may first be specified on the estimation uncertainties for any number of collaborating AVs in the environment. Second, the estimation performance is always improved as more collaborating AVs are added to the environment. However, this performance improvement, which is captured by the distance between the log {det $[P_{r'}]$} curves, becomes less significant as the number of collaborating AVs increases. The maximum improvement is obtained when going from one AV to two collaborating AVs. Third, when GPS becomes unavailable, the collaborative SOP-aided INS will perform significantly better than an INS only for any number of collaborating AVs in the environment. Fourth, two or more collaborating AVs equipped with SOP-aided INSs that are in the absence of GPS signals can achieve estimation performance comparable to one AV equipped with a traditional GPS-aided INS with access to GPS signals from eleven GPS SVs. By providing die ability to switch to navigating with a collaborative tightly-coupled SOP-aided INS, AVs equipped with consumer-grade IMUs navigating with the collaborative SOP-aided INS framework 1000 could achieve a performance comparable to when GNSS signals are still available.

Figure 11:
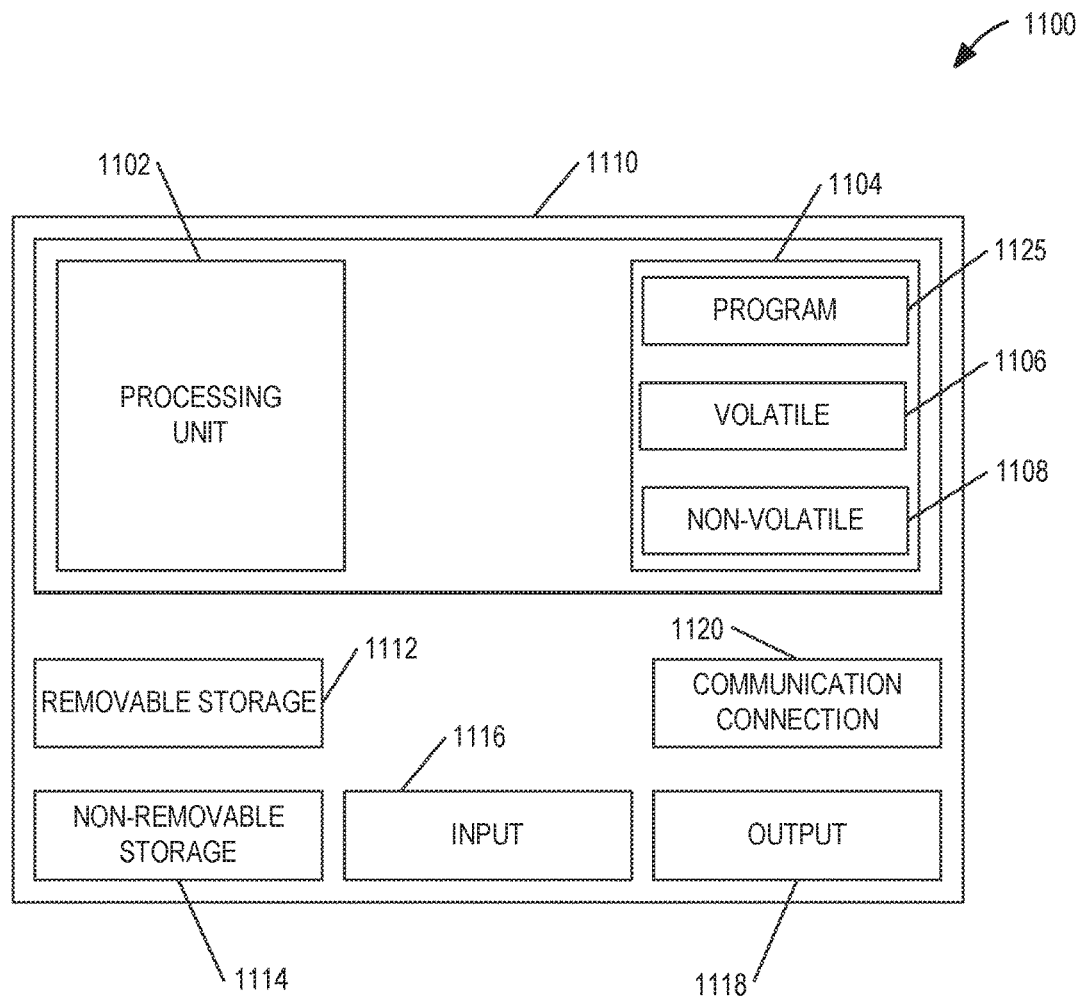
FIG. 11 is a block diagram of a computing device, according to an embodiment.

FIG. 11 is a block diagram of a computing device 1100, according to an embodiment. In one embodiment, multiple such computer systems are used in a distributed network to implement multiple components in a transaction-based environment. An object-oriented, service-oriented, or other architecture may be used to implement such functions and communicate between the multiple systems and components. In some embodiments, the computing device of FIG. 11 is an example of a client device that may invoke methods described herein over a network. In other embodiments, the computing device is an example of a computing device that may be included in or connected to a motion interactive video projection system, as described elsewhere herein. In some embodiments, the computing device of FIG. 11 is an example of one or more of the personal computer, smartphone, tablet, or various servers.

One example computing device in the form of a computer 1110, may include a processing unit 1102, memory 1104, removable storage 1112, and non-removable storage 1114. Although the example computing device is illustrated and described as computer 1110, the computing device may be in different forms in different embodiments. For example, the computing device may instead be a smartphone, a tablet, or other computing device including the same or similar elements as illustrated and described with regard to FIG. 11. Further, although the various data storage elements are illustrated as part of the computer 1110, the storage may include cloud-based storage accessible via a network, such as the Internet.

Returning to the computer 1110, memory 1104 may include volatile memory 1106 and non-volatile memory 1108. Computer 1110 may include or have access to a computing environment that includes a variety of computer-readable media, such as volatile memory 1106 and non-volatile memory 1108, removable storage 1112 and non-removable storage 1114. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1110 may include or have access to a computing environment that includes input 1116, output 1118, and a communication connection 1120. The input 1116 may include one or more of a touchscreen, touchpad, mouse, key board, camera, and other input devices. The input 1116 may include a navigation sensor input, such as a GNSS receiver, a SOP receiver, an inertial sensor (e.g., accelerometers, gyroscopes), a local ranging sensor (e.g., LIDAR), an optical sensor (e.g., cameras), or other sensors. The computer may operate in a networked environment using a communication connection 1120 to connect to one or more remote computers, such as database servers, web servers, and other computing device. An example remote computer may include a personal computer (PC), server, router, network PC, a peer device or other common network node, or the like. The communication connection 1120 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 1102 of the computer 1110. A hard drive (magnetic disk or solid state), CD-ROM, and RAM are some examples of articles including a non-transitory computer-readable medium. For example, various computer programs 1125 or apps, such as one or more applications and modules implementing one or more of the methods illustrated and described herein or an app or application that executes on a mobile device or is accessible via a web browser, may be stored on a non-transitory computer-readable medium.

To better illustrate the method and apparatuses disclosed herein, a non-limiting list of embodiments is provided here.

Each of these non-limiting examples can stand on its own, or can be combined in various permutations or combinations with one or more of the other examples.

Conventional terms in the fields of computer vision have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims. In addition, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the embodiments should be determined with reference to the appended claims, along with the full scope of equivalents to which such claims are entitled.

The invention claimed is:

1. A navigation system comprising:
   a global navigation satellite solution (GNSS) receiver to receive a plurality of GNSS signals from a plurality of GNSS satellites;
   an inertial navigation system (INS) to generate a plurality of INS measurements;
   a signal of opportunity (SOP) receiver to receive an SOP signal including an SOP base transceiver station clock error estimate from at least one SOP transceiver station; and
   a processor to:
   determine a plurality of GNSS pseudorange measurements based on the received plurality of GNSS signals;
   determine an SOP pseudorange measurement based on the received SOP signal and the SOP base transceiver station clock error estimate; and
   determine an estimated receiver position based on the plurality of INS measurements, the SOP pseudorange measurement, and the plurality of GNSS pseudorange measurements.

2. The system of claim 1, the system further including:
   a second GNSS receiver to receive a second plurality of GNSS signals;
   a second INS to generate a second plurality of INS measurements; and
   a second SOP receiver to receive a second SOP signal;
   wherein the processor is further to determine the estimated receiver position based on the second plurality of GNSS signals, the second plurality of INS measurements, and the second SOP signal.

3. The system of claim 1, the processor further to:
   determine that the received plurality of GNSS signals is unavailable; and
   determine an updated estimated receiver position based on the plurality of INS measurements and on the SOP pseudorange measurement, the updated estimated receiver position determined without requiring the plurality of GNSS pseudorange measurements.

4. The system of claim 3, the processor further to:
   determine the estimated receiver position based on a first Kalman filter; and
   determine the updated estimated receiver position based on a second Kalman filter.

5. The system of claim 1, wherein receiving the SOP signal includes receiving the clock error estimate from the at least one SOP transceiver station.

6. The system of claim 1, further including a stationary mapping receiver, wherein receiving the SOP signal includes receiving the clock error estimate at the SOP receiver from the stationary mapping receiver.

7. The system of claim 1, wherein the processor is further configured to generate the clock error estimate based on application of a simultaneous localization and mapping algorithm to the received SOP signal.

8. The system of claim 1, wherein the SOP receiver includes a hardware-defined radio.

9. The system of claim 1, wherein the SOP receiver includes a software-defined radio (SDR).

10. A navigation method comprising:
receiving a plurality of GNSS signals from a plurality of GNSS satellites at a global navigation satellite solution (GNSS) receiver;
receiving a plurality of inertial navigation system (INS) measurements from an INS;
receiving an SOP signal including an SOP base transceiver station clock error estimate from at least one SOP transceiver station at a signal of opportunity (SOP) receiver;
determining a plurality of GNSS pseudorange measurements based on the received plurality of GNSS signals;
determining an SOP pseudorange measurement based on the received SOP signal and the SOP base transceiver station clock error estimate; and
determining an estimated receiver position based on the plurality of GNSS pseudorange measurements, the plurality of INS measurements, and the SOP pseudorange measurement.

11. The method of claim 10, further including:
receiving a second plurality of GNSS signals from a second GNSS receiver;
receiving a second plurality of INS measurements from a second INS; and
receiving a second SOP signal from a second SOP receiver;
wherein determining the estimated receiver position is further based on the second plurality of GNSS signals, the second plurality of INS measurements, and the second SOP signal.

12. The method of claim 10, further including:
determining the received plurality of GNSS signals is unavailable; and
determining an updated estimated receiver position based on the plurality of INS measurements and on the SOP pseudorange measurement, the updated estimated receiver position determined without requiring the plurality of GNSS pseudorange measurements.

13. The method of claim 12, further including:
determining the estimated receiver position based on a first Kalman filter; and
determining the updated estimated receiver position based on a second Kalman filter.

14. The method of claim 10, wherein receiving the SOP signal includes receiving the clock error estimate from the at least one SOP transceiver station.

15. The method of claim 10, wherein receiving the SOP signal includes receiving the clock error estimate at the SOP receiver from a stationary mapping receiver.

16. The method of claim 10, further including generating the clock error estimate based on application of a simultaneous localization and mapping algorithm to the received SOP signal.

17. The method of claim 10, wherein receiving the SOP signal includes receiving the SOP signal at a hardware-defined radio.

18. The method of claim 10, wherein receiving the SOP signal includes receiving the SOP signal at a software-defined radio (SDR).

19. At least one non-transitory machine-readable storage medium, comprising a plurality of instructions that, responsive to being executed with processor circuitry of a computer-controlled device, cause the computer-controlled device to:
receive a plurality of GNSS signals from a plurality of GNSS satellites at a global navigation satellite solution (GNSS) receiver;
receive a plurality of inertial navigation system (INS) measurements from an INS;
receive an SOP signal including an SOP base transceiver station clock error estimate from at least one SOP transceiver station at a signal of opportunity (SOP) receiver;
determine a plurality of GNSS pseudorange measurements based on the received plurality of GNSS signals;
determine an SOP pseudorange measurement based on the received SOP signal and the SOP base transceiver station clock error estimate; and
determine an estimated receiver position based on the plurality of GNSS pseudorange measurements, the plurality of INS measurements, and the SOP pseudorange measurement.

20. The at least one non-transitory machine-readable storage medium of claim 19, the plurality of instructions further causing the computer-controlled device to:
determine the received plurality of GNSS signals is unavailable; and
determine an updated estimated receiver position based on the plurality of INS measurements and on the SOP pseudorange measurement, the updated estimated receiver position determined without requiring the plurality of GNSS pseudorange measurements.

* * * * *